US012748369B2

(12) United States Patent
Okano et al.

(10) Patent No.: US 12,748,369 B2
(45) Date of Patent: Sep. 29, 2026

(54) FIXING ROTATING MEMBER, FIXING DEVICE, AND ELECTROPHOTOGRAPHIC IMAGE FORMING APPARATUS

(71) Applicant: CANON KABUSHIKI KAISHA, Tokyo (JP)

(72) Inventors: Akira Okano, Kanagawa (JP); Matsutaka Maeda, Kanagawa (JP); Mizuki Kawabe, Kanagawa (JP); Kosei Hisadome, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/187,314

(22) Filed: Apr. 23, 2025

(65) Prior Publication Data

US 2025/0334910 A1 Oct. 30, 2025

(30) Foreign Application Priority Data

Apr. 24, 2024 (JP) ................................ 2024-070421

(51) Int. Cl.
*G03G 15/20* (2006.01)

(52) U.S. Cl.
CPC ..... *G03G 15/2057* (2013.01); *G03G 15/2064* (2013.01); *G03G 2215/2048* (2013.01)

(58) Field of Classification Search
CPC ........... G03G 15/2057; G03G 15/2064; G03G 2215/2048
See application file for complete search history.

(56) References Cited

U.S. PATENT DOCUMENTS

| | | | | |
|---|---|---|---|---|
| 6,223,017 B1 * | 4/2001 | Akutsu | H05B 3/0095 399/335 |
| 6,595,907 B1 * | 7/2003 | Ishikawa | H05B 3/0095 492/46 |
| 10,802,433 B1 | 10/2020 | Watanabe | |
| 2002/0175154 A1 * | 11/2002 | Karube | G03G 15/2057 219/553 |
| 2012/0148317 A1 * | 6/2012 | Samei | G03G 15/2053 399/328 |
| 2017/0160682 A1 * | 6/2017 | Nishizawa | G03G 15/2053 |

FOREIGN PATENT DOCUMENTS

| | | | | |
|---|---|---|---|---|
| CN | 1615049 A * | 5/2005 | G03G 15/2039 |
| CN | 109814352 A * | 5/2019 | G03G 15/2039 |
| EP | 4207946 A1 * | 7/2023 | H05B 6/1209 |
| JP | 2005084077 A | 3/2005 | |

(Continued)

*Primary Examiner* — Sevan A Aydin
(74) *Attorney, Agent, or Firm* — Canon U.S.A., Inc. IP Division

(57) ABSTRACT

A fixing rotating member, containing a resin base material, a heat generating layer extending on an outer peripheral surface of the resin base material, a silicon dioxide layer on an outer peripheral surface of the heat generating layer and on the outer peripheral surface of the resin base material in a region where the heat generating layer is not provided, and a resin layer on an outer peripheral surface of the silicon dioxide layer. The heat generating layer includes silver, the heat generating layer has a hole having an opening at a surface thereof facing the resin layer, the hole being at least partially filled with silicon dioxide, and the heat generating layer has pores.

9 Claims, 10 Drawing Sheets

(56) References Cited

FOREIGN PATENT DOCUMENTS

| | | | |
|---|---|---|---|
| JP | 2008143113 | A | 6/2008 |
| JP | 2008158352 | A | 7/2008 |
| JP | 2015206883 | A | 11/2015 |
| JP | 5834477 | B2 | 12/2015 |
| JP | 2017138358 | A | 8/2017 |
| JP | 2021051136 | A | 4/2021 |

* cited by examiner

FIXING ROTATING MEMBER, FIXING DEVICE, AND ELECTROPHOTOGRAPHIC IMAGE FORMING APPARATUS

BACKGROUND

Technical Field

The present disclosure relates to a fixing rotating member used in a fixing device of an electrophotographic image forming apparatus such as an electrophotographic copying machine or a printer, a fixing device, and an electrophotographic image forming apparatus.

Description of the Related Art

A fixing device mounted on an electrophotographic image forming apparatus such as an electrophotographic copying machine or a printer generally fixes a toner image on a recording material by heating the recording material carrying an unfixed toner image at a nip portion, which is formed by a heated fixing rotating member and a pressure roller in contact with the fixing rotating member while conveying the recording material.

A fixing device of an electromagnetic induction heating system has been developed and put into practical use, the fixing device having a heat generating layer on a fixing rotating member and being able to directly heat the heat generating layer. The fixing device of the electromagnetic induction heating system has an advantage that a warm-up time is short.

The heat generating layer requires conductivity and durability against repeated strain under heating. For example, Japanese Patent Application Publication No. 2021-051136 discloses a fixing member having a heat generating layer formed by copper plating and having a predetermined pattern.

SUMMARY

The inventors have an expectation of an effect of reducing uneven heat generation and have attempted to apply a silver nano-ink capable of controlling a fine line width and a space when forming a heat generating layer. The heat generating layer formed of a silver nano-ink is advantageous in bending resistance because it can be formed into a thin layer. In addition, the heat generating layer has approximately submicron pores. For this reason, pores exhibit damper effects even for stress in a compression direction due to pressurization and heating, and occurrence of buckling or the like can be curbed. As a result, the effect of improving durability can be expected.

On the other hand, in a fixing rotating member, there is a phenomenon that the temperature of a member increases at an end where paper does not pass, that is, a so-called paper non-passing portion. The fixing rotating member is heated to maintain a fixing temperature at any time in order to reliably fix toner at a paper passing portion through which paper passes. Since the paper passes through the paper passing portion while taking away heat, heating is continuously required. On the other hand, in the paper non-passing portion, there is no transfer of heat due to the passage of paper, and thus the temperature of the member may become higher than a set temperature. This phenomenon is likely to occur particularly under special use environments such as continuous printing on small-sized paper.

The inventors found that, when a fixing rotating member using a silver nano-ink for manufacturing a heat generating layer is used, the resistance of the heat generating layer increases when a high temperature state above a set temperature continues for a long period of time in a paper non-passing portion. When the resistance increases in the paper non-passing portion of such small-sized paper, the amount of heat generation due to electromagnetic induction becomes uneven, and when fixing to larger-sized paper, the fixing properties at the end of the paper deteriorate.

The present disclosure relates to a fixing rotating member that is excellent in durability even in a printing environment where a high temperature state continues for a long time. The present disclosure also relates to a fixing device including the fixing rotating member and an electrophotographic image forming apparatus.

The present disclosure relates to a fixing rotating member, comprising: a resin base material; a heat generating layer extending on an outer peripheral surface of the resin base material; a silicon dioxide layer on an outer peripheral surface of the heat generating layer and on the outer peripheral surface of the resin base material in a region where the heat generating layer is not provided; and a resin layer on an outer peripheral surface of the silicon dioxide layer, wherein the heat generating layer comprises silver, the heat generating layer has a hole having an opening at a surface thereof facing the resin layer, the hole being at least partially filled with silicon dioxide, and the heat generating layer has pores.

The present disclosure provides a fixing rotating member that is excellent in durability even in a printing environment where a high temperature state continues for a long time.

The present disclosure also provides a fixing device including the fixing rotating member.

The present disclosure also provides an electrophotographic image forming apparatus including the fixing device.

Further features of the present disclosure will become apparent from the following description of exemplary embodiments with reference to the attached drawings.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. In the present disclosure, wording such as "at least one selected from the group consisting of XX, YY and ZZ" means any of: XX; YY; ZZ; a combination of XX and YY; a combination of XX and ZZ; a combination of YY and ZZ; or a combination of XX and YY and ZZ.

A fixing rotating member including a heat generating layer, a fixing device including the fixing rotating member, and an image forming apparatus according to the present disclosure will be described in detail with reference to the following specific configurations.

Figure 1:
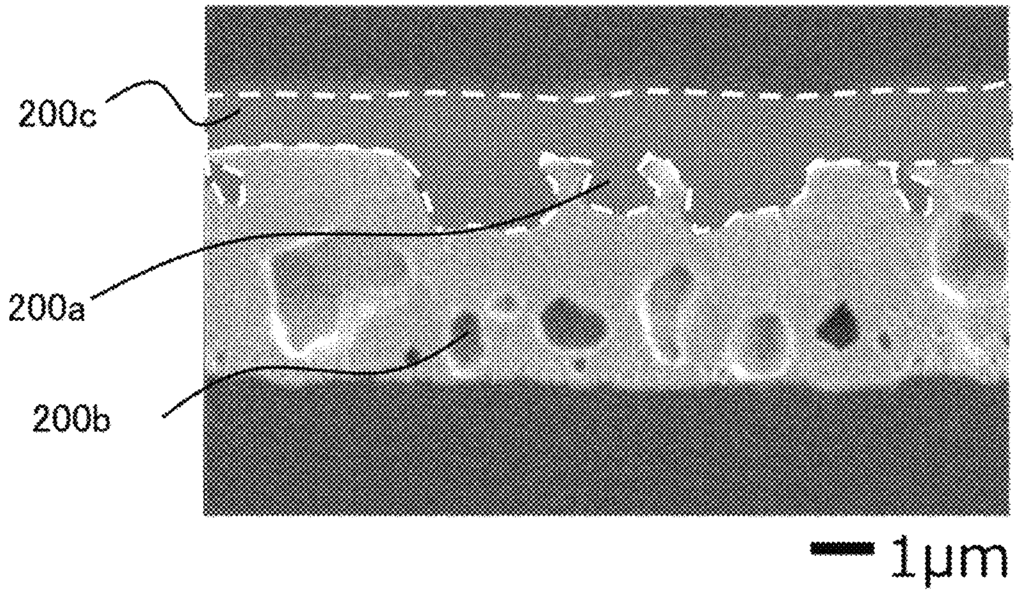
FIG. 1 is a cross-sectional view of a heat generating layer formed of a silver nano-ink according to the present disclosure.

As described above, when the fixing rotating member using a silver nano-ink for manufacturing the heat generating layer is used, the resistance of the heat generating layer may increase when a high temperature state above a set temperature continues for a long time in a paper non-passing portion. FIG. 1 shows a cross-sectional view of a heat generating layer formed using a silver nano-ink. The heat generating layer formed using silver nano-ink has a smaller grain size of silver crystals than that formed using bulk silver, and is characterized by having pores 200*a* and pores 200*b*, resulting in a significantly large grain boundary area. For this reason, it is considered that a region where silver reacts with oxygen also becomes larger, oxidation is more likely to proceed than in bulk silver, and resistance is increased.

The inventors have found that, by forming a silicon dioxide layer on the outer peripheral surface of a silver-containing heat generating layer, an increase in resistance of the heat generating layer can be curbed even when a high temperature state continues for a long time. As a result, the durability of the fixing rotating member is excellent even in a printing environment where a high temperature state continues for a long time.

The reason why an increase in resistance of the heat generating layer can be curbed by forming the silicon dioxide layer is that it is considered that a silicon dioxide layer 200*c* becomes a barrier layer by covering the outer peripheral surface of the heat generating layer with the dense silicon dioxide layer 200*c*, the surface area of the heat generating layer in contact with oxygen is reduced by filling the pores 200*a* that open to the outermost surface with silicon dioxide, and an increase in resistance can be curbed even in a high temperature state.

A fixing rotating member including a heat generating layer, a fixing device including the same, and an electrophotographic image forming apparatus will be described in detail below with reference to specific configurations.

However, the dimensions, materials and shapes of components described in this embodiment, relative arrangements thereof, and the like should be changed appropriately depending on the configurations of members to which the present disclosure is applied and various conditions. That is, the scope of this disclosure is not intended to be limited to the following forms. In the following description, components having the same function are denoted by the same reference numerals in the drawings, and description thereof may be omitted.

Reference numerals in the drawings are as follows.

1 denotes an image forming apparatus, 15 denotes a fixing device, 20 denotes a fixing rotating member, 20*a* denotes a resin base material, 20*b* denotes a heat generating layer, 20*c* denotes a protecting layer, 20*d* denotes a surface layer, 20*e* denotes an elastic layer, 20*f* denotes an adhesive layer, and 21 denotes a pressure roller.

Electrophotographic Image Forming Apparatus

An electrophotographic image forming apparatus (hereinafter also simply referred to as "image forming apparatus") according to an embodiment of the present disclosure includes an image carrier carrying a toner image, a transfer device transferring the toner image to a recording material, and a fixing device fixing the transferred toner image on the recording material. The fixing device is a fixing device according to an embodiment of the present disclosure, which will be described later.

Figure 2:
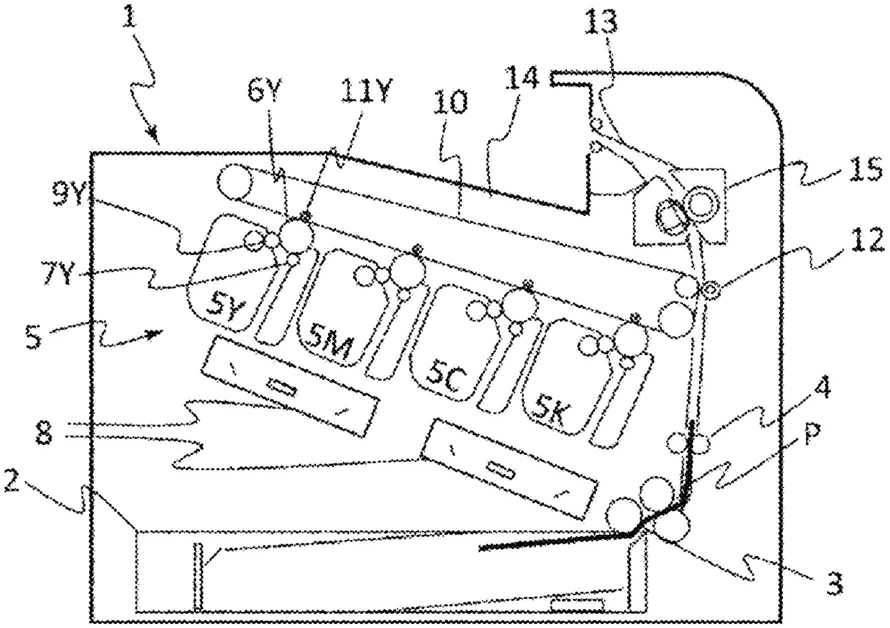
FIG. 2 is a schematic diagram showing an example of a configuration of an electrophotographic image forming apparatus.

FIG. 2 is a cross-sectional view showing the overall configuration of a color laser beam printer (hereinafter referred to as a printer) 1 as an example of an image forming apparatus equipped with a fixing device (image heating device) 15 according to an embodiment. A cassette 2 is accommodated in a lower portion of the printer 1 so as to be pulled out. A sheet P which is a recording material are loaded and accommodated in the cassette 2. The sheets P in the cassette 2 are fed to a registration roller 4 while being separated one by one by a separation roller 3.

As the sheet P which is a recording material, various sheets of different sizes and materials, for example, paper such as plain paper and thick paper, a plastic film, fabric, a sheet material subjected to a surface treatment such as coated paper, and a sheet material having a special shape such as an envelope or index paper can be used.

The printer 1 includes an image forming unit 5 as an image forming means in which image forming stations 5Y, 5M, 5C, and 5K corresponding to respective colors of yellow, magenta, cyan and black are arranged side by side in a horizontal row. The image forming station 5Y is provided with a photoreceptor drum 6Y which is an image carrier (electrophotographic photoreceptor) and a charging roller 7Y as a charging means for uniformly charging the surface of the photoreceptor drum 6Y. Further, a scanner unit 8 is disposed below the image forming unit 5. The scanner unit 8 forms an electrostatic latent image on the photoreceptor drum 6Y by emitting a laser beam which is on/off modulated in response to a digital image signal input from an external apparatus such as a computer (not shown) on the basis of image information and generated by an image processing means.

Further, the image forming station 5Y is provided with a developing roller 9Y as a developing means for developing the electrostatic latent image of the photoreceptor drum 6Y as a toner image (toner image) by sticking toner to the electrostatic latent image, and a primary transfer unit 11Y for transferring the toner image on the photoreceptor drum 6Y to an intermediate transfer belt 10.

Toner images formed by the same process in the other image forming stations 5M, 5C and 5K are multiply transferred to the toner image on the intermediate transfer belt 10 to which the toner image is transferred in the primary transfer unit 11Y. Thereby, a full-color toner image is formed on the intermediate transfer belt 10. The full-color toner image is transferred to the sheet P by a secondary transfer unit 12 as a transfer means. The primary transfer unit 11Y and the secondary transfer unit 12 are examples of transfer devices that fix a transferred toner image on a recording material.

Thereafter, the toner image transferred onto the sheet P (on the recording material) passes through the fixing device 15 and is fixed as a fixed image. Further, the sheet P passes through a discharge conveyance unit 13 and is discharged and loaded on a loading unit 14.

The image forming unit 5 is an example of an image forming means, and the image forming apparatus may use, for example, a configuration that directly transfers a toner image from the image carrier to the sheet P, or a monochromatic configuration using only one color of toner.

Fixing Device

Figure 3:
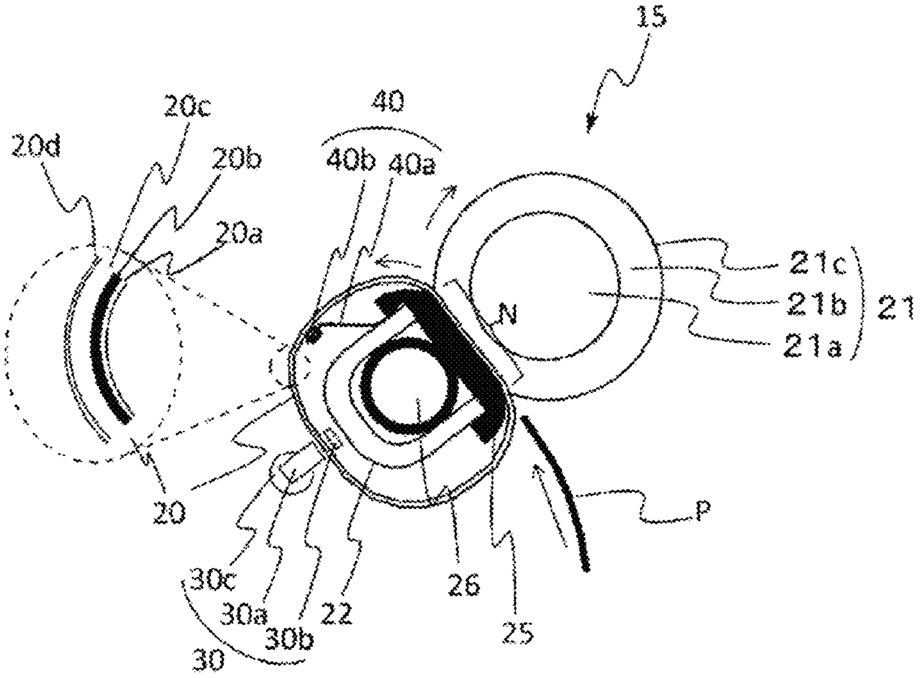
FIG. 3 is a schematic diagram showing an example of a cross-sectional configuration of a fixing device.
Figure 4:
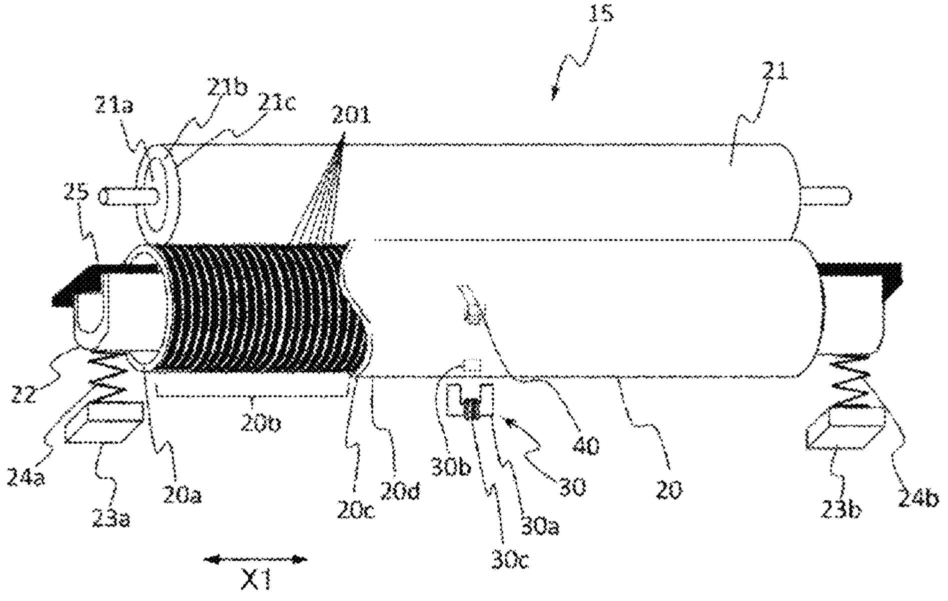
FIG. 4 is a schematic diagram showing an example of a cross-sectional configuration of a fixing device.

The fixing device 15 according to an embodiment of the present disclosure is a fixing device (image heating device) including a fixing rotating member according to an embodiment of the present disclosure, which will be described later, and an induction heating device that causes the fixing rotating member to generate heat by induction heating (electromagnetic induction). FIG. 3 shows a cross-sectional configuration of the fixing device 15, and FIG. 4 is a perspective view of the fixing device 15. The housing and the like of the fixing device 15 are not shown in FIGS. 3 and 4. In the following description, a longitudinal direction X1 of the members configuring the fixing device 15 is a direction orthogonal to the conveyance direction of the recording material and the thickness direction of the recording material, that is, the rotation axis direction of a fixing rotating member 20.

Figure 5:
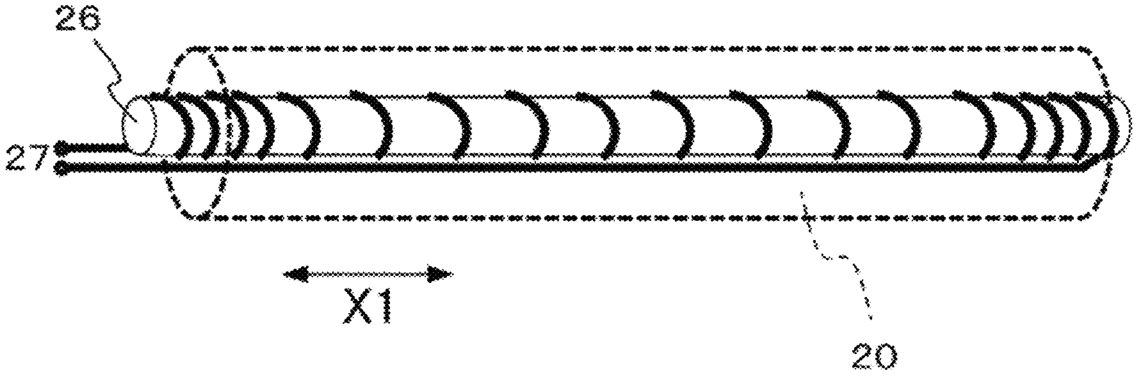
FIG. 5 is a schematic diagram showing an example of a magnetic core and an exciting coil of a fixing device.
Figure 6:
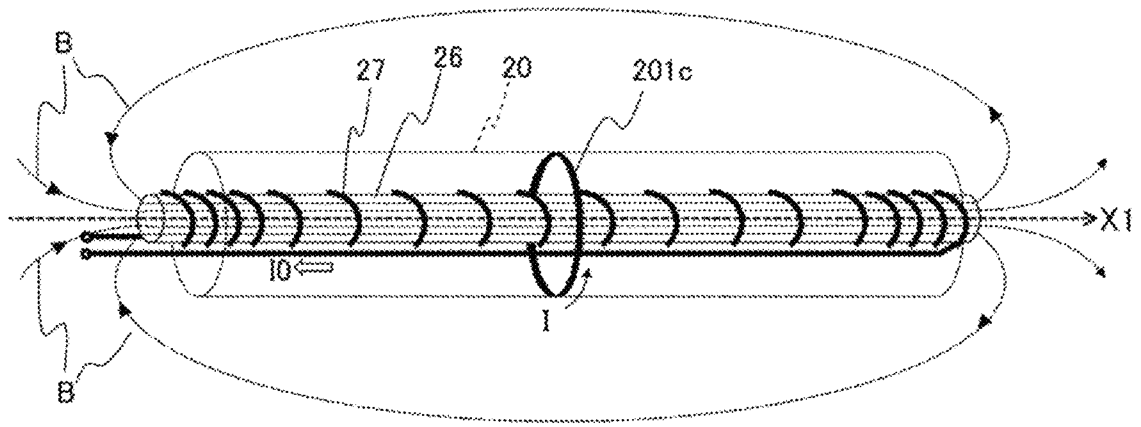
FIG. 6 is a diagram showing a magnetic field formed when a current is supplied to an exciting coil.

The fixing device 15 includes the fixing rotating member 20, a film guide 25, a pressure roller 21, a pressing stay 22, a magnetic core 26, a thermistor 40, and a current sensor 30. The fixing device 15 fixes an image on the recording material by heating the recording material on which the image is formed. The fixing rotating member 20 is a fixing rotating member of this embodiment, and the pressure roller 21 is an opposing member of this embodiment. Further, as shown in FIGS. 5 and 6, the fixing device 15 may include an exciting coil 27 that functions as a magnetic field generating means in this embodiment. Details of the fixing rotating member will be described later.

The fixing rotating member 20 includes the resin base material 20*a*, the heat generating layer 20*b* on the outer peripheral surface of the resin base material 20*a*, and a resin layer provided on the outer peripheral surface (the surface on a side opposite to the side facing the resin base material 20*a*) side of the heat generating layer 20*b*. A silicon dioxide layer (not shown) is provided on the outer peripheral surface of the heat generating layer and on the outer peripheral surface of the resin base material in a region where the heat generating layer is not formed, and the resin layer is formed on the outer peripheral surface of the silicon dioxide layer. The resin layer may be configured with a plurality of layers. The resin layers in FIGS. 3 and 4 are a protective layer 20*c* and a surface layer (release layer) 20*d*.

The heat generating layer 20*b* is formed in a ring shape by being electrically connected in the circumferential direction, and heat generating rings 201 (FIG. 4), which are electrically separated in the longitudinal direction X1 (the rotation axis direction of the fixing rotating member 20), can be formed as heat generating patterns arranged in the longitudinal direction. That is, the heat generating layer 20*b* has a plurality of segments arranged in the rotation axis direction of the fixing rotating member and electrically separated from each other, and each of the plurality of segments can be configured to be electrically continuous over the entire region of the fixing rotating member in the circumferential direction. It is preferable that the heat generating rings 201, which are components of a heat generating pattern, be formed with a uniform width in the longitudinal direction X1.

The pressure roller 21 as an opposing body (pressure member) facing the fixing rotating member 20 includes a core bar 21*a* and an elastic layer 21*b* concentrically and integrally molded around the core bar in a roller shape, and a release layer 21*c* is provided on a surface layer. It is preferable that the elastic layer 21*b* be formed of a material having excellent heat resistance, such as silicone rubber, fluorine rubber, or fluorosilicone rubber. Both ends of the core bar 21*a* in the longitudinal direction are rotatably held and disposed between chassis side sheet metals (not shown) of the device via a conductive bearing.

Further, as shown in FIG. 4, pressing springs 24*a*, 24*b* are provided in a compressed manner between both ends of the pressing stay 22 in the longitudinal direction and spring receiving members 23*a*, 23*b* on the device chassis side, respectively, to apply a pressing force to the pressing stay 22.

In the fixing device 15 of this embodiment, a pressing force of a total pressure of approximately 100 N to 300 N (approximately 10 kgf to approximately 30 kgf) is preferably applied. Thereby, the lower surface of the film guide 25 formed of a heat-resistant resin, such as polyphenylene sulfide (PPS), and the upper surface of the pressure roller 21 are brought into pressure contact with each other across the fixing rotating member 20, which is a cylindrical rotating member, to form a fixing nip portion N having a predetermined width. The film guide 25, together with the pressure roller 21, functions as a nip portion forming member that forms a nip portion that holds and conveys a recording material carrying a toner image through the fixing rotating member 20.

The pressure roller 21 is driven to rotate in the clockwise direction in FIG. 3 by a drive means (not shown), and a counterclockwise rotational force is applied to the fixing rotating member 20 by a frictional force with the outer surface of the fixing rotating member 20. Thereby, the fixing rotating member 20 rotates while sliding on the film guide 25.

FIG. 5 is a schematic diagram of the magnetic core 26 and the exciting coil 27 shown in FIG. 3, and the fixing rotating member 20 is shown by a dashed line in order to explain a positional relationship with the fixing rotating member 20. An induction heating device in an induction heating type fixing device that causes the fixing rotating member 20 to generate heat by electromagnetic induction may include the magnetic core 26 and the exciting coil 27.

The exciting coil 27 is disposed inside the fixing rotating member 20. The exciting coil 27 includes a spiral shape portion of which the spiral axis is substantially parallel to a direction along the rotation axis of the fixing rotating member 20, and forms an alternating magnetic field for making the heat generating layer 20*b* generate heat by electromagnetic induction. "Substantially parallel" means that two axes allow not only a completely parallel state but also a slight deviation to the extent that the heat generating layer can be heated by electromagnetic induction.

The magnetic core 26 is disposed in the spiral shape portion, extends in the rotation axis direction of the fixing rotating member 20, and does not form a loop outside the fixing rotating member 20. The magnetic core 26 induces lines of magnetic force of an alternating magnetic field.

In FIG. 5, the magnetic core 26 is inserted into a hollow portion of the fixing rotating member 20, which is a cylindrical rotating member. The exciting coil 27 is spirally wound around the outer periphery of the magnetic core 26 and extends in the longitudinal direction of the fixing rotating member 20. The magnetic core 26 has a cylindrical shape and is fixed by a fixing means (not shown) so as to be located substantially at the center of the fixing rotating member 20 in a cross-section viewed in the longitudinal direction (see FIG. 3).

The magnetic core 26 provided inside the exciting coil 27 has a role of guiding the lines of magnetic force (magnetic flux) of the alternating magnetic field generated by the exciting coil 27 to the inside of the heat generating layer 20*b* of the fixing rotating member 20 and forming a path (magnetic path) for the lines of magnetic force. The material of the magnetic core 26 is preferably a material having a small hysteresis loss and a high relative magnetic permeability, for example, at least one soft magnetic material having a high magnetic permeability selected from the group consisting of baked ferrite, ferrite resin, and the like.

The cross-sectional shape of the magnetic core 26 may be any shape that can be accommodated in the hollow portion of the fixing rotating member 20, and although it is not necessary to have a circular shape, it is preferable that the cross-sectional area can be enlarged as far as possible. The diameter of the magnetic core 26 is preferably 5 mm to 20 mm, more preferably 8 mm to 12 mm. In the fixing device used in an example of the present disclosure, the diameter of the magnetic core 26 was 10 mm and the length in the longitudinal direction was 280 mm.

The exciting coil 27 is formed by spirally winding a copper wire (single conductor) having a diameter of 1 mm to 2 mm covered with heat-resistant polyamide imide around the magnetic core 26, preferably 5 to 40 turns, more preferably 10 to 30 turns. In the fixing device used in the example of the present disclosure, the exciting coil 27 was formed by spirally winding the copper wire 20 turns. The exciting coil 27 is wound around the magnetic core 26 in a direction crossing the rotation axis direction of the fixing rotating member 20. For this reason, when a high-frequency alternating current is applied to the exciting coil 27, an alternating magnetic field is generated in a direction parallel to the rotation axis direction, and an induced current (circulating current) flows through each heat generating ring 201 of the heat generating layer 20*b* of the fixing rotating member 20 in accordance with the principle to be described below to generate heat.

As shown in FIGS. 3 and 4, the thermistor 40 as a temperature detecting means for detecting the temperature of the fixing rotating member 20 is configured with a spring plate 40*a* and a thermistor element 40*b*. The spring plate 40*a* is a support member having spring elasticity extending toward the inner surface of the fixing rotating member 20. The thermistor element 40*b* as a temperature detection element is installed at the tip of the spring plate 40*a*. The surface of the thermistor element 40*b* is covered with an insulator such as a polyimide tape to ensure electrical insulation. The thickness of the insulator is preferably from 10 μm to 100 μm, more preferably 25 μm to 75 μm. In the fixing device used in the example of the present disclosure, a polyimide tape having a thickness of 50 μm was used.

The thermistor 40 is fixed to the film guide 25 at a position substantially in the center of the fixing rotating member 20 in the longitudinal direction. Then, the thermistor element 40*b* is pressed against the inner surface of the fixing rotating member 20 by the spring elasticity of the spring plate 40*a* and held in a contact state. The thermistor 40 may be disposed on the outer peripheral side of the fixing rotating member 20.

A current sensor 30 constituting a conduction monitoring device for monitoring the conduction in the circumferential direction of the heat generating layer 20*b* is arranged at the same position as the thermistor 40 in the longitudinal direction of the fixing device 15. That is, the current sensor 30 monitors the state of conduction of the heat generating ring 201 located at a position in contact with the thermistor element 40*b* among the plurality of heat generating rings 201 constituting the heat generating pattern of the fixing rotating member 20. The current sensor 30 is composed of an outer magnetic core 30*a*, an inner magnetic core 30*b*, and a detection coil 30*c*. A secondary current generated in a detection coil 30*c* also changes due to a change in magnetic flux between an outer magnetic core 30*a* and an inner magnetic core 30*b*. By measuring the change in the secondary current of the detection coil 30*c*, it is possible to detect whether a conduction failure has occurred.

Heating Principle

The heating principle of the fixing rotating member 20 in the induction heating type fixing device 15 will be described below. FIG. 6 is a concept diagram showing the moment the current is increasing in the direction of arrow 10 in the exciting coil 27. The exciting coil 27 is inserted into the fixing rotating member 20, forms an alternating magnetic field in the rotation axis direction of the fixing rotating member 20 by flowing an alternating current, and functions as a magnetic field generating means for generating an induced current I in the circumferential direction of the fixing rotating member 20.

Further, the magnetic core 26 functions as a member that induces a line of magnetic force B (dotted line in FIG. 6) generated by the exciting coil 27 and forms a magnetic path. A general induction heating system is configured such that lines of magnetic force penetrate through the heat generating layer to generate an eddy current, whereas lines of magnetic force B loops on the outside of the fixing rotating member in this embodiment. That is, the heat generating layer 20*b* is mainly heated by an induced current induced by lines of magnetic force coming out of one longitudinal end of the magnetic core 26, passing through the outside of the heat generating layer 20*b*, and returning to the other longitudinal end of the magnetic core 26. Thus, even when the thickness of the heat generating layer is as thin as 5 μm or less, heat can be efficiently generated.

When an alternating magnetic field is formed by the exciting coil 27, an induced current I according to the Faraday's law flows through each heat generating ring 201 of the heat generating layer 20*b* of the fixing rotating member 20. The Faraday's law is "when a magnetic field in a circuit is changed, an induced electromotive force for applying a current into the circuit is generated, and the induced electromotive force is proportional to a change over time in a magnetic flux vertically penetrating the circuit".

Regarding a heat generating ring 201*c* located at the center of the magnetic core 26 shown in FIG. 6 in the longitudinal direction, an induced current I flowing through the heat generating ring 201*c* when a high-frequency alternating current flows through the exciting coil 27 is considered. When a high-frequency alternating current flows, an alternating magnetic field is formed inside the magnetic core 26. The induced electromotive force acting on the heat generating ring 201*c* at that time is proportional to a change over time in the magnetic flux vertically penetrating the inside of the heat generating ring 201*c* in accordance with the following formula:

$$V = -N\frac{\Delta\Phi}{\Delta t}$$

V: Induced electromotive force

N: Number of turns of coil $\Delta\Phi/\Delta t$: Change in magnetic flux vertically penetrating circuit (heat generating ring 201*c*) at minute time $\Delta t$.

An induced current I, which is a circulating current circulating around the heat generating ring 201*c*, flows by the induced electromotive force V, and the heat generating ring 201*c* generates heat by the Joule heat generated with the induced current I. However, when the heat generating ring 201*c* is disconnected, the induced current I does not flow and the heat generating ring 201*c* does not generate heat.

The fixing rotating member according to one embodiment of the present disclosure (hereinafter, also referred to as the fixing rotating member) is a fixing rotating member, comprising: a resin base material; a heat generating layer extending on an outer peripheral surface of the resin base material; a silicon dioxide layer on an outer peripheral surface of the heat generating layer and on the outer peripheral surface of the resin base material in a region where the heat generating layer is not provided; and a resin layer on an outer peripheral surface of the silicon dioxide layer, wherein the heat generating layer comprises silver, the heat generating layer has a hole having an opening at a surface thereof facing the resin layer side, the hole being at least partially filled with silicon dioxide, and the heat generating layer has pores.

(1) Outline of Configuration of Fixing Rotating Member

Details of the fixing rotating member will be described with reference to the drawings.

The fixing rotating member may be a rotatable member such as an endless belt.

Figure 7:
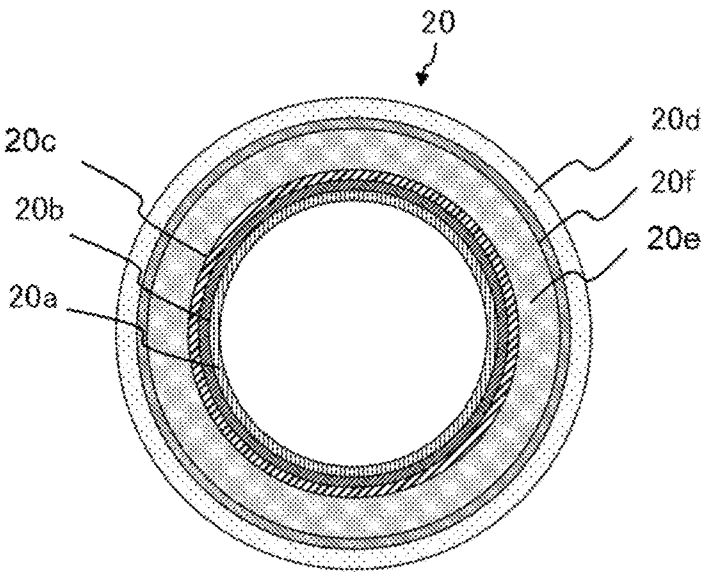
FIG. 7 is a diagram showing an example of a cross-sectional configuration of a fixing rotating member.

FIG. 7 is a cross-sectional view of an example of a fixing rotating member in the circumferential direction. The fixing rotating member includes a cylindrical resin base material 20*a* containing at least a resin, a heat generating layer 20*b* on the outer peripheral surface of the resin base material 20*a*, and a resin layer that is provided on the outer peripheral surface (a surface on a side opposite to the side facing the resin base material 20*a*) side of the heat generating layer 20*b*. A silicon dioxide layer (not shown) is provided on the outer peripheral surface of the heat generating layer and on the outer peripheral surface of the resin base material in a region where the heat generating layer is not formed, and the resin layer is formed on the outer peripheral surface of the silicon dioxide layer. The resin layer is a layer containing a resin, specifically a protective layer 20*c* to be described below. The resin layer may be configured with a plurality of layers, and may have an elastic layer 20*e* and a surface layer (release layer) 20*d* as necessary on the outer peripheral side rather than the protective layer 20*c*. In addition, an adhesive layer 20*f* may be provided between the elastic layer 20*e* and the surface layer 20*d*.

FIG. 7 shows the fixing rotating member including, as resin layers, the protective layer 20*c*, the elastic layer 20*e*, the adhesive layer 20*f*, and the surface layer (release layer) 20*d* in this order from the inner peripheral side of the fixing rotating member as an example.

(2) Resin Base Material

The material of the resin base material 20*a* is not particularly limited as long as it contains at least a resin. That is, the resin base material 20*a* contains a resin. When a belt is used for an electromagnetic induction type fixing device, it is preferable that the resin base material 20*a* be a layer which has little change in physical properties and can maintain high strength in a state where the heat generating layer 20*b*, which is a conductive layer, generates heat. For this reason, it is preferable that the resin base material 20*a* contain a heat-resistant resin as a main component and be formed of a heat-resistant resin. The heat-resistant resin is a resin that does not dissolve or decompose at a temperature of, for example, less than 200° C. (preferably less than 250° C.).

The resin contained in the base material 20*a* (preferably the resin constituting the resin base material) is preferably at least one selected from the group consisting of polyimide (PI), polyamide-imide (PAI), modified polyimide, and modified polyamide-imide. More preferably, the resin is at least one selected from the group consisting of polyimide and polyamide-imide. Among these, polyimide is particularly preferable. In the present disclosure, the main component means a component that is contained in the largest amount by mass among the components configuring the object (here, the resin base material).

Examples of the modification in the modified polyimide and the modified polyamide-imide include modified siloxane, modified carbonate, modified fluorine, modified urethane, modified triazine, modified phenol, and the like.

In the fixing rotating member, the material of the resin base material 20*a* is analyzed by the following procedure.

A sample of a resin base material which is a 10 mm square and has a thickness being a total thickness is cut out from the fixing rotating member. At this time, when there is an elastic layer or a surface layer, the sample is cut out after removal with a razor, a solvent or the like. The material of the resulting sample is confirmed by performing total reflection (ATR) measurement using infrared spectrometry (FT-IR) (trade name: Frontier FT IR, PerkinElmer Inc.).

Further, the material of the resin layer to be described later is analyzed in the same manner as described above.

A filler may be incorporated in the resin base material 20*a* to improve heat insulation and strength.

The shape of the resin base material can be appropriately selected in accordance with the shape of the fixing rotating member and can be various shapes such as an endless belt shape, a hollow cylindrical shape, and a film shape.

When the fixing rotating member is a fixing belt, the thickness of the resin base material 20*a* is preferably, for example, 10 to 100 μm, and more preferably, 20 to 60 μm. By setting the thickness of the resin base material 20*a* within the above-mentioned range, both strength and flexibility can be achieved at a high level.

In addition, on the inner peripheral surface of the resin base material (a surface on a side opposite to the side facing the heat generating layer 20*b*), for example, a layer for preventing wear of the inner peripheral surface of the fixing rotating member when the inner peripheral surface of the fixing rotating member is in contact with another member or a layer for improving a sliding property with respect to the other member may be provided.

Another member such as a sliding member is disposed on the inner surface of the resin base material 20*a*, and a sliding load is large. For this reason, in order to ensure durability of a resin base material, the resin base material is preferably a solid layer.

The solid layer is a layer that substantially includes no pores therein. "Substantially includes no pores" means that pores are not intentionally provided, but the presence of inevitably mixed pores such as scratches and cracks and chipping of materials is allowed. The presence or absence of pores can be observed by cross-sectional observation of the base material. The cross-sectional observation of the base material can be performed in the same manner as cross-sectional observation of the protective layer to be described below.

A solid layer can be provided in the base material 20*a* by using a cylindrical base material molded while substantially not including pores. For example, in the case of a thermosetting resin such as polyimide or polyamide-imide, when a solvent in a coating film is evaporated during molding, a sudden temperature rise may cause bumping and form pores. For this reason, it is preferable to set a treatment temperature and a treatment time so that the solvent does not perform bumping when evaporating the solvent in the coating film.

The outer peripheral surface of the resin base material 20*a* is subjected to a surface roughening treatment such as blast, or a modification treatment such as ultraviolet rays, plasma, or chemical etching in order to improve adhesion and wettability with respect to the heat generating layer 20*b*.

(3) Heat Generating Layer

The heat generating layer 20*b* is a layer that generates heat when electrified. In the principle of heat generation by induction heating using an exciting coil, when an alternating current is supplied to the exciting coil disposed in the vicinity of the fixing rotating member, a magnetic field is induced, a current is generated in the heat generating layer 20*b* of the fixing rotating member by the magnetic field, and heat is generated by the Joules heat. The heat generating layer extends in the circumferential direction of the outer peripheral surface of the resin base material.

The heat generating layer 20*b* contains silver. Silver has a low volume resistivity and is less likely to be oxidized. The content of silver with respect to the entire heat generating layer 20*b* is preferably 90.0 mass % or more, more preferably 99.0 mass % or more, and particularly preferably 99.9 mass % or more. Examples of the upper limit include 99.999 mass % or less and 99.99 mass % or less. The content of silver with respect to the entire heat generating layer 20*b* is preferably 90.0 to 99.999 mass %, and more preferably 99.9 to 99.99 mass %.

The volume resistivity of the heat generating layer 20*b* is preferably in the range of $1.0\times10^{-8}$ to $8.0\times10^{-8}$ Ω·m, the range of $2.0\times10^{-8}$ to $7.0\times10^{-8}$ Ω·m, and the range of $2.0\times10^{-8}$ to $6.0\times10^{-8}$ Ω·m.

The volume resistivity of the heat generating layer 20*b* can be reduced by increasing the purity and content of silver contained in the heat generating layer 20*b*.

The volume resistivity can be measured by a four-terminal resistance measurement method by peeling off the resin layer portion with a cutter.

The silver contained in the heat generating layer 20*b* is preferably a silver crystal, and the number average crystal grain size of the silver crystal is preferably 500 nm or less. The number average crystal grain size of the silver crystal is preferably from 50 to 500 nm, more preferably from 100 to 200 nm, and still more preferably from 150 to 180 nm. When the number average crystal grain size is within the above-mentioned ranges, the fixing rotating member 20 is pressurized and deformed at the nip portion N, and even when stress is repeatedly applied, a large number of stable crystal interfaces are formed on the heat generating layer 20*b*, and thus the occurrence of cracks at the crystal interfaces is curbed and durability is excellent.

By forming the heat generating layer 20*b* using a silver nano-ink or the like to be described later, silver crystals can be contained in the heat generating layer 20*b*. The number average crystal grain size of the silver crystal can be adjusted by the particle size of silver nanoparticles to be mixed in a silver nano-ink or the like.

The heat generating layer has pores. Specifically, at least one pore is present in a cross-section perpendicular to the circumferential direction of the heat generating layer. The presence of pores in the heat generating layer reduces a difference between a compressive elastic modulus of the heat generating layer 20*b* in a compression direction and a compressive elastic modulus of the resin configuring the resin base material or the resin layer by a damper effect. When the difference in compressive elastic modulus between the resin configuring the resin base material or the resin layer and the heat generating layer is small, it is possible to prevent excessive stress from being applied to the interface between the conductive layer and the resin configuring the resin base material or the resin layer when local compressive deformation is applied to an end of paper, that is, a so-called paper edge. It is preferable to adjust the amount of pores and the size of the pore.

For this reason, from the viewpoint of conductivity and durability, a compressive elastic modulus in the region of 10% to 20% in the thickness direction of the heat generating layer, which is measured by bringing an indenter into contact with the surface of the heat generating layer on a side opposite to the surface facing the silicon dioxide layer, is preferably 5 to 50 GPa, more preferably 8 to 30 GPa, and particularly preferably 9 to 15 GPa.

Details of a method of measuring the compressive elastic modulus will be described later in examples.

The compressive elastic modulus can be reduced by increasing the porosity of the heat generating layer, and can be increased by decreasing the porosity of the heat generating layer.

The holes completely filled with the material of silicon dioxide or resin do not exhibit a damper effect and do not contribute to a reduction in the compressive elastic modulus. For this reason, in order to achieve both an effect of curbing an increase in resistance by filling with silicon dioxide and an improvement in mechanical durability by a damper effect, it is preferable to curb the amount of holes filled with silicon dioxide within an appropriate range. When the compressive elastic modulus is within the range described above, the ratio of holes filled with silicon dioxide or a resin is not particularly specified, but it is preferable that the holes filled with silicon dioxide or a resin are half or less relative to the pores not filled with silicon dioxide or a resin. Whether the holes (pores) are filled with silicon dioxide or a resin can be determined from an EDS image to be described below.

As a method of providing pores in the heat generating layer 20*b*, for example, after a pattern is formed on the heat generating layer 20*b* by a photolithography process, holes are formed by chemical etching or holes are formed by using a laser or a focused ion beam. In the present disclosure, pore formation using a silver nano-particle material is particularly described.

Figure 8A:
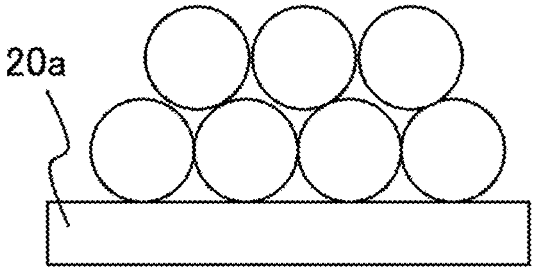
FIGS. 8A and 8B are schematic diagrams showing a film forming mechanism of a silver nano-ink.
Figure 8B:
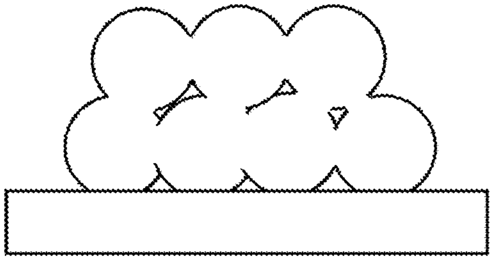

The heat generating layer is preferably a baked body of a coating film of a silver-nano ink. When a coating material mixed with silver nanoparticles having a particle size of approximately 10 to 50 nm is formed, the heat generating layer becomes porous in a state where particles are stacked as shown in FIG. 8A. Since the silver nanoparticles are unstable in surface energy, the particles are fused to each other even by low-temperature baking of approximately 100° C., and can be formed into a film with nano-sized pores as shown in FIG. 8B. The size and number of pores can be expressed as a porosity.

Specifically, the ratio (porosity) of the pores in the cross-section of the heat generating layer, which is measured by observing the cross-section obtained by cutting the heat generating layer, which is sampled from the fixing rotating member, in the thickness direction is preferably 15 to 50 area %, more preferably 15 to 45 area %, and more preferably 17 to 40 area %. By setting the porosity within the above range, the compressive elastic modulus of the heat generating layer can be easily controlled within a preferable range, and as a result, conductivity and durability are excellent.

The porosity can be increased by increasing the temperature at the time of baking the heat generating layer. Further, the porosity can be reduced by lowering the temperature at the time of baking the heat generating layer.

Here, the number average crystal grain size and porosity of silver in the heat generating layer are determined as follows.

First, an evaluation sample is prepared. One sample having a length of 5 mm, a width of 5 mm and a thickness equal to the total thickness of the fixing rotating member is collected from the central portion of the fixing rotating member in the rotation axis direction. For the resulting sample, the cross-section of the fixing rotating member which is perpendicular to the circumferential direction is polished by using an ion beam. At this time, a machining position is adjusted so that the cross-section of the heat generating layer which is perpendicular to the circumferential direction is exposed by polishing using the ion beam.

An ion milling device (trade name: IM4000, manufactured by Hitachi High-Tech Corporation) is used to polish the cross-section using the ion beam. In the polishing of the cross-section using the ion beam, falling of a filler from the sample and mixing of an abrasive can be prevented, and the cross-section with less polishing marks can be formed.

Subsequently, a thin film having a thickness of 3 nm is formed on the cross-section after the processing by using an osmium coater (trade name: Tennant20) to impart conductivity. Further, the cross-section of the heat generating layer is observed with a scanning electron microscope (SEM) (trade name: JSM-F100, manufactured by JEOL Ltd.) to obtain a cross-sectional image and an energy dispersive X-ray spectroscopy (EDS) image. The observation point is a position where the center of the heat generating layer in the thickness direction is the center of the SEM image in the vertical direction, and is in a range of 12.8 μm by 9.6 μm in size. An observation condition is a 10,000-fold reflected electron image mode, reflected electron image acquisition conditions are an acceleration voltage of 5.0 kV and a working distance of 10 mm, and an EDS image is also acquired under these conditions.

Next, the resulting image is subjected to binarization processing by commercially available image software so that silver-containing metal crystal particle portions become white and portions other than the crystal particles become black. Specifically, a reflected electron image is read by image analysis software ImageProPlus manufactured by MediaCybernetics Inc., and a luminance distribution of the image is obtained. Next, by setting the luminance range of the obtained luminance distribution, binarization for distinguishing between the silver-containing metal crystal particles and parts other than the crystal particles is performed.

The Otsu's method is used as a method for the binarization.

Figure 9A:
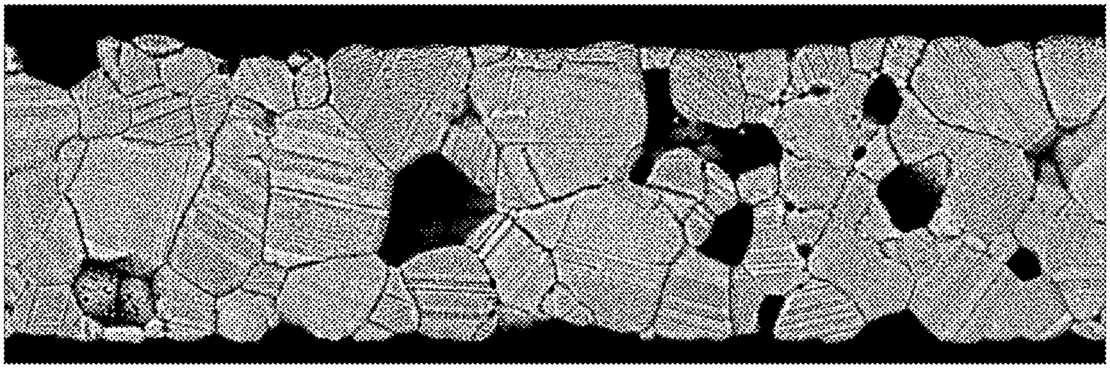
FIGS. 9A and 9B show a cross-sectional image and a binarized image of a heat generating layer of a fixing rotating member according to the present disclosure.
Figure 9B:
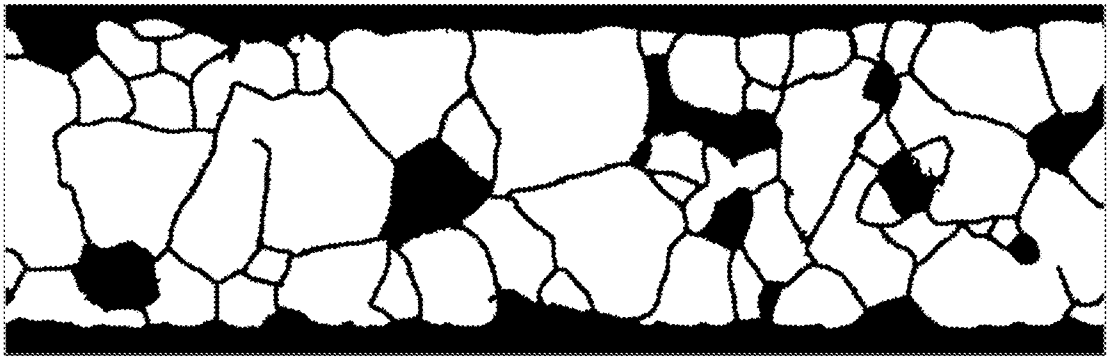

Then, a line dividing the crystal particles, which is obtained from a contrast difference due to a difference in brightness between the crystal particles or a difference in crystal orientation in FIG. 9A which is a cross-sectional image, is added to a binarized image to obtain a binarized image in which the crystal particles are divided (FIG. 9B).

The portion filled in black in FIG. 9B is pores included in the heat generating layer or a material of a layer other than the heat generating layer, for example, polyimide or polyamide-imide as a resin base material. The open holes on the outer peripheral surface side of the heat generating layer are also filled with silicon dioxide of the present disclosure (FIG. 1, 200*a*). It can be confirmed from the EDS image whether the holes are filled with silicon dioxide because the elements of Si and O are distributed in the holes on the outer peripheral surface side of the heat generating layer. The location where Si and O of 5 element % or more are present in the EDS image within the hole is the location where the silicon dioxide layer is formed or filled. In the present disclosure, it is important to prevent air from flowing into a hole that is open to the resin layer (the outer peripheral surface side of the heat generating layer) via the resin layer. When the hole is filled with silicon dioxide, at least a part of the hole is filled, it is preferable that at least an opening of the hole be filled with silicon dioxide, and it is more preferable that the entire region of the inner surface of the hole is filled with silicon dioxide.

In addition, whether layers other than the heat generating layer are filled with materials (such as polyimide, polyamide, or the like) can be determined by whether C of 5 element % or more is contained in the EDS image within the hole in the same manner as silicon dioxide.

A method of calculating the number average crystal grain size from the binarized image of the cross-section of the heat generating layer obtained in this manner will be described. Since a digital image processing technique is applied to these images, it is assumed that all the images have a general digital image format in which pixels are arranged in a grid pattern. In addition, the binarized image is a gray scale image only including luminance information, and then, images obtained by performing image processing on these images are all gray scale images of the same format unless otherwise noted.

First, an equivalent circle diameter of each crystal particle is calculated. The equivalent circle diameter of each crystal particle means the diameter of a circle having the same area as the area of the crystal particle. Specifically, the number of pixels configuring each crystal particle is calculated, and the actual area of the crystal particle is calculated by multiplying the number of pixels by the area of one pixel.

In the SEM image used in the present disclosure, the length of one side of one pixel is equivalent to 0.01 μm, and thus the number of pixels configured with each crystal particle is multiplied by $0.01 \times 0.01\ \mu m^2$. Further, the equivalent circle diameter is calculated by obtaining the diameter of a circle having this area.

The total sum of the equivalent circle diameters of the crystal particles obtained in this manner is divided by the total number of crystal particles to calculate a number average crystal grain size.

Here, a total of six measurement samples are collected as follows. That is, as described above, one sample is collected from the central portion of the fixing rotating member in the rotation axis direction. When the length of the fixing rotating member in the rotation axis direction is L, one sample is collected from a portion separated from the central portion by 0.1 L in the rotation axis direction. From each sampling point, a total of six samples are collected similarly at portions 120° and 240° away in the circumferential direction of the fixing rotating member.

The above operations are repeatedly performed for the six samples collected from the fixing rotating member to calculate the number average crystal grain size of each of the samples. Further, the arithmetic mean value of these six number average crystal grain sizes is calculated to calculate the number average crystal grain size of silver crystals in the heat generating layer.

Further, a method of calculating a porosity from the binarized image of the cross-section of the heat generating layer obtained in this manner will be described.

In the binarized image acquired by the above procedure, an image of 2.0 μm by 2.0 μm in size is cut out. Four images are cut out from one SEM image. The position where the image is cut out is set as a position where the center of the heat generating layer in the thickness direction is the center position of the cut-out image in the vertical direction. In addition, the four images are cut out such that intervals of the four images are the same in a direction orthogonal to the thickness direction of the heat generating layer. The above operations are performed for six SEM images to obtain cross-sectional images of 24 locations.

Particles of a silver-containing metal crystal are expressed as white regions, and an area occupied by the crystal particles in an image is calculated. Specifically, the number of pixels configuring each crystal particle is calculated, and the sum of the number of pixels is calculated. By multiplying the sum of the number of pixels by 0.01×0.01 $\mu m^2$ which is the area of one pixel, an area occupied by the crystal particles can be calculated.

Further, as described above, the black-filled region is a material of a layer other than pores and the heat generating layer. Consequently, an area occupied by the materials other than the heat generating layer in the black-filled region is calculated. Specifically, the number of pixels configuring each of the materials other than the heat generating layer is calculated, and the total sum of the number of pixels is calculated. By multiplying the sum of the number of pixels by 0.01×0.01 $\mu m^2$ which is the area of one pixel, an area occupied by the materials other than the heat generating layer can be calculated.

Since a porosity indicates the proportion of a space that is not occupied by the crystal particles or the materials other than the heat generating layer, the porosity can be expressed as follows using the area occupied by the crystal particles and the area occupied by the materials other than the heat generating layer, which are obtained above.

Porosity (%)=(2.0×2.0 ($\mu m^2$)−area occupied by crystal particles ($\mu m^2$)−area occupied by materials other than heat generating layer ($\mu m^2$))/(2.0×2.0 ($\mu m^2$))×100

The porosity is calculated for 24 locations in the range of 2.0 μm×2.0 μm in size of the cross-sectional image of the heat generating layer, and an average porosity obtained by the arithmetic mean is set as the porosity of the heat generating layer.

The thickness of the heat generating layer **20*b* is preferably 10.0 μm or less, and more preferably 5.0 μm or less. This is because the fixing rotating member should have a moderate flexibility and a small heat capacity. Still another advantage is an improvement in flex resistance. As shown in FIG. 3, the fixing rotating member 20 is driven to rotate while being pressed by the film guide 25 and the pressure roller 21. With each rotation, the fixing rotating member 20** is pressurized and deformed at the nip portion N and receives stress.

It is preferable that the heat generating layer **20*b* of the fixing rotating member 20 be designed not to cause fatigue fracture even when the repeated bending is continuously applied until the durable life of the fixing device. When the thickness of the heat generating layer 20*b* is reduced, the resistance to fatigue fracture of the heat generating layer 20*b* is significantly improved. This is because, when the heat generating layer 20*b* is pressed and deformed along the shape of the curved surface of the film guide 25, an internal stress acting on the heat generating layer 20*b* becomes smaller as the heat generating layer 20*b*** becomes thinner.

For the reasons described above, the thickness of the heat generating layer **20*b* is preferably 10.0 μm or less, and more preferably 5.0 μm or less from the viewpoint of reducing heat capacity and further improving fatigue fracture resistance. The lower limit is not particularly limited, but may be, for example, 1.0 μm or more and 2.0 μm or more. The thickness of the heat generating layer 20*b*** may be, for example, 1.0 to 10.0 μm, 1.0 to 5.0 μm, 2.0 to 5.0 μm, and 2.0 to 4.0 μm.

The heat generating layer **20*b* extends in the circumferential direction of the outer peripheral surface of the resin base material 20*a*. The heat generating layer 20*b* may generate heat when electrified and may be configured in a predetermined pattern. Particularly, as shown in FIG. 4, from the viewpoint of safety, it is preferable to adopt a configuration in which a plurality of heat generating layers 20*b* formed in a ring shape in the circumferential direction of the fixing rotating member be formed in an electrically divided state in the rotation axis direction. With such a configuration, a local temperature rise can be curbed when a crack occurs in the heat generating layer 20*b***. It is preferable that the ring shape has a substantially fixed width in the axial direction of the rotating body.

When such a pattern configuration is adopted, the surface area of the heat generating layer **20*b*** increases, but the presence of a silicon dioxide layer to be described below in the present disclosure can curb degradation due to oxidation.

The width of the ring of the heat generating layer **20*b*** is preferably 100 μm or more from the viewpoint of manufacturability and pyrogenicity, more preferably 200 μm or more, and still more preferably 300 μm or more. From the viewpoint of uneven heat generation and safety, the width of the ring is preferably 1000 μm or less, more preferably 900 μm or less, and still more preferably 700 μm or less. The width of the ring is, for example, 100 to 1000 μm, 200 to 900 μm, and 300 to 700 μm.

An interval between the rings of the heat generating layer **20*b*** is preferably 50 μm or more from the viewpoint of manufacturability and pyrogenicity, and more preferably 100 μm or more. From the viewpoint of uneven heat generation, the interval is preferably 400 μm or less, and more preferably 300 μm or less. The interval between rings is, for example, 50 to 400 μm and 100 to 300 μm.

As described above, the silicon dioxide layer is provided on the outer peripheral surface side of the heat generating layer. A method of forming the silicon dioxide layer is not particularly limited, but may be a physical vapor deposition (PVD) method, a chemical vapor deposition (CVD) method, a solution coating method, a dipping method, a spray method, and the like.

The silicon dioxide layer in the present disclosure is characterized by being installed on the outer peripheral surface side of the heat generating layer, and being filled in a hole that is open to the resin layer side of the heat generating layer containing silver. As described above, the heat generating layer formed using a silver nano-ink is characterized by being porous, having a smaller crystal grain size than bulk silver, and having a significantly large grain boundary area because it has the pores 200*b*. For this reason, it is considered that a region reacting with oxygen in the air is also enlarged, making oxidation more likely to proceed than in bulk silver, resulting in an increase in resistance. Thus, it is preferable that the surface of the heat generating layer on the outer peripheral surface side is covered with the silicon dioxide layer without a gap.

Such a silicon dioxide layer can be formed, for example, by infiltration with a solution of a polysilazane. As a coating method, dipping, flow coating, or contact coating using a sponge or the like can be used. In the present disclosure, a coating method using a sponge will be described.

Figure 10:
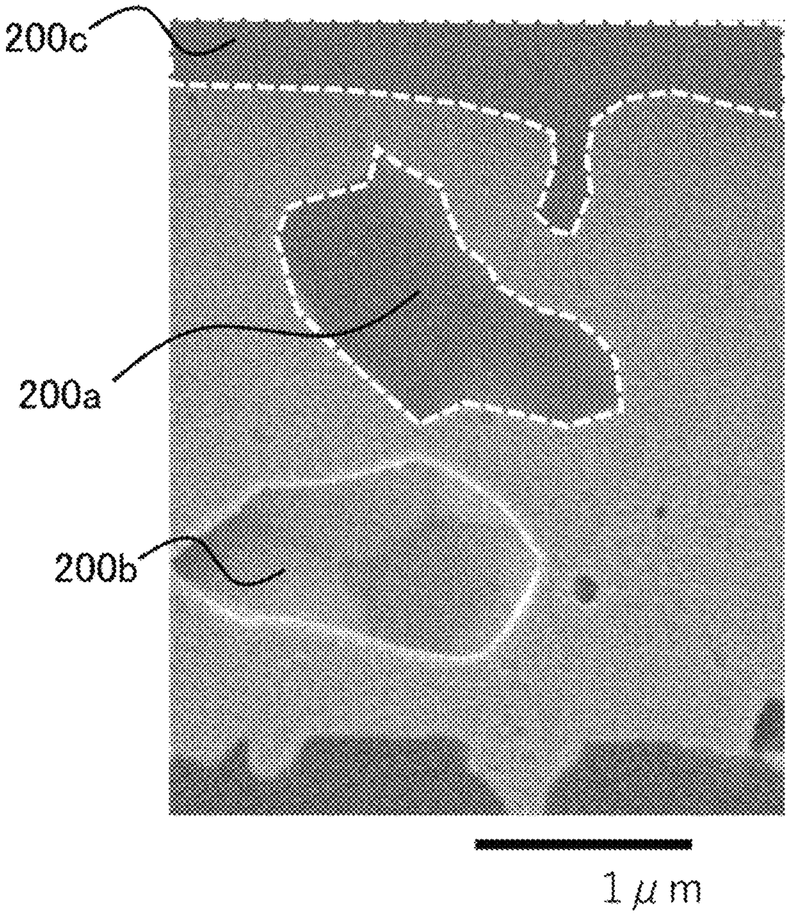
FIG. 10 is a cross-sectional image of a heat generating layer of a fixing rotating member according to the present disclosure.

In order to infiltrate the polysilazane solution into the heat generating layer, for example, the polysilazane solution is infiltrated into a urethane sponge, and the solution is applied by tracing the outer peripheral surface of the stacked body completed until the formation of the heat generating layer, and is then heated to form a film. FIG. 10 is a drawing showing a silicon dioxide layer infiltrated into the heat generating layer. The pore 200*b* without any opening remains as a pore. On the other hand, although the pore 200*a* in FIG. 10 appears like an unopened pore at a glance, it is filled with silicon dioxide. This indicates that there is an opening somewhere in the depth direction, or that the polysilazane solution has been infiltrated through a narrow opening, causing the silicon dioxide to fill the space. When the opening is covered with the silicon dioxide layer even when the pore is not fully filled, oxygen is prevented from being infiltrated, and the effect of the present disclosure is exhibited.

Although the film thickness formed by the viscosity of the solution varies, the coating and heating are repeated until the required film thickness is reached to obtain a desired thickness. The thickness of the silicon dioxide layer is 2.00 μm or less, more preferably 1.50 μm or less, and particularly preferably 1.00 μm or less, in view of applying repeated stresses to the fixing rotating member. The lower limit is not particularly limited, but may be, for example, 0.10 μm or more and 0.50 μm or more. The thickness of the silicon dioxide layer is, for example, 0.10 to 2.00 μm, 0.50 to 1.50 μm, and 0.50 to 1.00 μm.

Here, the film thickness of the silicon dioxide layer is defined by measuring the thickness of the silicon dioxide layer formed in a region where the heat generating layer is not formed on the outer peripheral surface of the resin base material. On the other hand, no silicon dioxide is infiltrated into a pore that is not open to the outer peripheral surface side, and the pore is maintained. For this reason, the advantage of stress applied in the compression direction as described above is not impaired at all.

As the polysilazane solution, a solution in which perhydropolysilazane (PHPS) is dissolved in an organic solvent is suitable. Examples thereof include a Silica Shield series manufactured by Exousia Inc., a Durazane series manufactured by Merck Performance Materials Ltd., and the like. These liquids can be used to form a highly crosslinked silicon dioxide layer by hydrolysis at relatively low temperatures, for example, temperatures of approximately 100° C. to 250° C.

A step of preparing the stacked body configuring the fixing rotating member according to the present disclosure includes, for example, a step of obtaining a resin base material, and a step of applying a silver nano-ink to the outer peripheral surface of the resulting resin base material and baking it to obtain a heat generating layer.

The step of obtaining the resin base material is not particularly limited. For example, a resin base material having an endless belt shape or a roller shape can be used. For example, a resin base material can be obtained by applying a resin material of the resin base material to the surface of a mold, such as a cylindrical shape, and heating it when necessary.

Next, a silver nano-ink is applied to the outer peripheral surface of the resulting resin base material and is baked (sintered) to form a heat generating layer. The temperature during the baking is not particularly limited, but is preferably 150 to 450° C. and more preferably 250 to 350° C. That is, the heat generating layer is preferably a baked body (sintered body) of silver nanoparticles. The baking time is also not particularly limited, and may be, for example, 10 to 120 minutes.

(4) Resin Layer

In the present disclosure, a portion including the protective layer 20*c*, the elastic layer 20*e*, the adhesive layer 20*f*, and the surface layer 20*d* may be expressed as a resin layer. The resin layer may be only one protective layer or one surface layer.

(5) Protective Layer

The fixing rotating member may include a protective layer on the outer peripheral surface of the silicon dioxide layer. The protective layer 20*c* protects the heat generating layer 20*b*, and has a function of ensuring insulation and improving strength of the heat generating layer 20*b*.

The material configuring the protective layer 20*c* is not particularly limited. The material of the protective layer 20*c* is preferably a layer containing at least a resin. When a belt is used for an electromagnetic induction type fixing device, it is preferable that the protective layer 20*c* be a layer having little change in physical properties and maintaining high strength in a state where the heat generating layer 20*b* generates heat, similar to the resin base material 20*a*.

For this reason, the protective layer 20*c* preferably contains a heat-resistant resin, more preferably contains a heat-resistant resin as a main component, and preferably is formed of a heat-resistant resin. The heat-resistant resin is a resin that does not dissolve or decompose at a temperature of, for example, less than 200° C. (preferably less than 250° C.).

The resin configuring the protective layer 20*c* preferably contains at least one selected from the group consisting of polyimide (PI), polyamide-imide (PAI), modified polyimide, and modified polyamide-imide. More preferably, the resin is at least one selected from the group consisting of polyimide and polyamide-imide. Modification is similar to that described in the resin base material 20*a*.

Among these, polyimide is particularly preferable. The main component means a component that is contained in the largest amount among the components configuring the object (here, the protective layer). Methods of forming the resin base material 20*a* and the protective layer 20*c* are not particularly limited. For example, an imide-based material can be formed into a film in a liquid form of varnish by applying and baking it using a known method.

The protective layer 20*c* may contain a thermally conductive filler from the viewpoint of a heat transfer property. The heat transfer property of the protective layer 20*c* is improved by containing the thermally conductive filler, and heat generated in the heat generating layer 20*b* can be efficiently transferred to the outer peripheral surface of the fixing rotating member by improving the heat transfer property.

The thickness of the protective layer 20*c* is preferably 10 to 100 μm, and more preferably 20 to 60 μm. From the viewpoint of bending resistance of the heat generating layer 20*b*, it is preferable that the thickness of the protective layer 20*c* be adjusted so that the heat generating layer 20*b* is positioned on the neutral axis. The neutral axis refers to a position where a tensile force and a compressive force balance each other in the cross-section when a bending moment occurs in the member. Here, when the neutral axis is in the conductive layer, a tensile force and a compressive stress applied to the conductive layer are minimized, and a phenomenon that leads to an increase in resistance such as cracking and permanent deformation is less likely to occur, thereby improving durability. In addition, when the neutral axis is positioned on the protective layer side even when the neutral axis deviates from the conductive layer, stress applied to the conductive layer can be brought to the compression side, and durability can be improved more than when a tensile stress is applied.

In the fixing rotating member, the elastic layer and the surface layer having a low elastic modulus do not substantially have an effect when calculating the neutral axis, and thus the neutral axis can be calculated from the thickness and elastic modulus of the resin base material 20*a* and the thickness and elastic modulus of the protective layer 20*c*. Specifically, the heat generating layer 20*b* can be positioned on the neutral axis by adjusting the thickness of each layer so that a product of a thickness $y_1$ of the protective layer and an elastic modulus $E_1$ is equal to a product of thickness $y_2$ of the resin base material and an elastic modulus $E_2$.

(6) Elastic Layer

The fixing rotating member may include the elastic layer 20*e* on the outer peripheral side of the protective layer 20*c*. The elastic layer 20*e* is a layer for imparting flexibility to the fixing rotating member to secure a fixing nip in the fixing device. When the fixing rotating member is used as a heating member in contact with toner on paper, the elastic layer 20*e* also functions as a layer for imparting flexibility so that the surface of the heating member may follow the unevenness of the paper.

The elastic layer 20*e* contains, for example, rubber as a matrix and particles dispersed in the rubber. More specifically, it is preferable that the elastic layer 20*e* contain rubber and a thermally conductive filler, and it is preferable that the elastic layer 20*e* is formed of a cured material obtained by curing a composition containing at least raw materials of the rubber (a base polymer, a crosslinking agent, and the like) and a thermally conductive filler.

From the viewpoint of exhibiting the function of the elastic layer 20*e* described above, it is preferable that the elastic layer 20*e* be formed of a silicone rubber cured material containing thermally conductive particles, and it is more preferable that the elastic layer 20*e* be formed of a cured material of an addition curing silicone rubber composition.

The thickness of the elastic layer may be, for example, 100 μm to 1000 μm and 200 μm to 500 μm.

The silicone rubber compositions may include thermally conductive particles, base polymers, cross-linking agents and catalysts, as well as additives when necessary. Since the silicone rubber composition is mostly liquid, the thermally conductive filler is easily dispersed, and the elasticity of the elastic layer 20*e* to be manufactured is easily adjusted by adjusting the degree of crosslinking in accordance with the type and addition amount of the thermally conductive filler.

The matrix functions to exhibit elasticity in the elastic layer 20*e*. It is preferable that the matrix contain silicone rubber from the viewpoint of exhibiting the function of the elastic layer 20*e*. The silicone rubber is preferably since it has high heat resistance capable of maintaining flexibility even under a high temperature of approximately 240° C. in the paper non-passing portion. As the silicone rubber, for example, a cured material of an addition curing liquid silicone rubber composition to be described later can be used. The elastic layer 20*e* can be formed by applying and heating the liquid silicone rubber composition by a known method.

The liquid silicone rubber composition typically contains the following components (a) to (d):

Component (a): organopolysiloxane having an unsaturated aliphatic group

Component (b): organopolysiloxane having active hydrogen bonded to silicon

Component (c): catalysts

Component (d): thermally conductive filler

Each component will be described below.

Component (a)

The organopolysiloxane having an unsaturated aliphatic group is organopolysiloxane having an unsaturated aliphatic group, such as a vinyl group, and includes, for example, those shown in Formulas (1) and (2) below.

(1)

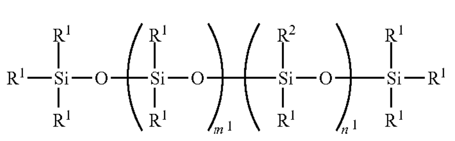

In Formula (1), $m^1$ represents an integer of 0 or more (preferably 500 to 1100), and $n^1$ represents an integer of 3 or more (preferably 10 to 40). Further, in Formula (1), $R^1$ each independently represents a monovalent unsubstituted or substituted hydrocarbon group that does not contain an unsaturated aliphatic group, where at least one of $R^1$ represents a methyl group, and $R^2$ each independently represents an unsaturated aliphatic group.

(2)

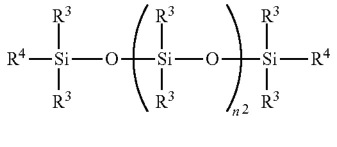

In Formula (2), $n^2$ represents a positive integer (preferably 500 to 1100), and $R^3$ each independently represents a monovalent unsubstituted or substituted hydrocarbon group that does not contain an unsaturated aliphatic group, where at least one of $R^3$ represents a methyl group, and $R^4$ is each independently represents an unsaturated aliphatic group.

Examples of the monovalent unsubstituted or substituted hydrocarbon group that does not contain an unsaturated aliphatic group and which can be represented by $R^1$ and $R^3$ in Formulas (1) and (2) may include the following groups.

Unsubstituted Hydrocarbon Group

Alkyl group (for example, methyl group, ethyl group, propyl group, butyl group, pentyl group, hexyl group)

Aryl group (for example, phenyl group)

Substituted Hydrocarbon Group

Substituted alkyl group (for example, chloromethyl group, 3-chloropropyl group, 3,3,3-trifluoropropyl group, 3-cyanopropyl group, 3-methoxypropyl group)

The organopolysiloxane represented by Formulas (1) and (2) has at least one methyl group directly bonded to a silicon atom forming a chain structure. Because of the ease of synthesis and handling, it is preferable that 50% or more of each of $R^1$ and $R^3$ be methyl groups, and it is more preferable that all of $R^1$ and $R^3$ be methyl groups.

In addition, examples of the unsaturated aliphatic group that can be represented by $R^2$ and $R^4$ in Formulas (1) and (2) may include the following groups: That is, examples of the unsaturated aliphatic group may include a vinyl group, an allyl group, a 3-butenyl group, a 4-pentenyl group, a 5-hexenyl group, and the like. Among these groups, both $R^2$ and $R^4$ are preferably a vinyl group because they are easily synthesized and handled, have a low cost, and a crosslinking reaction is easily performed.

From the viewpoint of moldability, the viscosity of the component (a) is preferably from 1000 $mm^2/s$ to 50000 $mm^2/s$, and more preferably from 3000 $mm^2/s$ to 20000 $mm^2/s$. When the viscosity is 1000 $mm^2/s$ or more, a hardness required for the elastic layer 20*c* is easily adjusted, and when the hardness is 50000 $mm^2/s$ or less, the viscosity of the composition is not too high, and coating is facilitated. The viscosity (kinetic viscosity) can be measured using a capillary viscometer, a rotational viscometer, or the like on the basis of JIS Z 8803:2011.

The compounding amount of the component (a) is preferably 55 vol % or more from the viewpoint of durability and 65 vol % or less from the viewpoint of heat transfer, on the basis of the liquid silicone rubber composition used for forming the elastic layer 20*e*.

Component (b)

Organopolysiloxane having active hydrogen bonded to silicon reacts with the unsaturated aliphatic group of the component (a) by the action of a catalyst, and functions as a crosslinking agent for forming a cured silicone rubber.

As the component (b), any organopolysiloxane having a Si—H bond can be used. In particular, from the viewpoint of reactivity with an unsaturated aliphatic group of the component (a), those having an average of three or more hydrogen atoms bonded to silicon atoms in one molecule are suitably used.

Specific examples of the component (b) include linear organopolysiloxane represented by the following Formula (3) and cyclic organopolysiloxane represented by the following Formula (4).

(3)

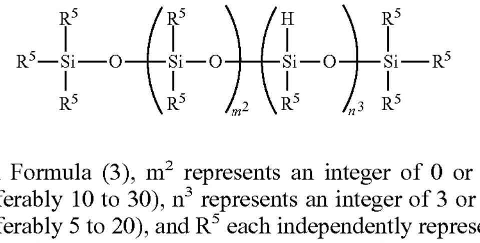

In Formula (3), $m^2$ represents an integer of 0 or more (preferably 10 to 30), $n^3$ represents an integer of 3 or more (preferably 5 to 20), and $R^5$ each independently represents a monovalent unsubstituted or substituted hydrocarbon group that does not contain an unsaturated aliphatic group.

(4)

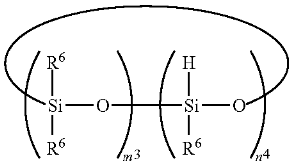

In Formula (4), $m^3$ represents an integer of 0 or more (preferably 10 to 30), $n^4$ represents an integer of 3 or more (preferably 5 to 20), and $R^6$ each independently represents a monovalent unsubstituted or substituted hydrocarbon group that does not contain an unsaturated aliphatic group.

Examples of the monovalent unsubstituted or substituted hydrocarbon group that does not contain an unsaturated aliphatic group and which can be represented by $R^5$ and $R^6$ in Formulas (3) and (4) include groups similar to $R^1$ in the above-described Formula (1). Among these, it is preferable that 50% or more of $R^5$ and $R^6$ be methyl groups, and it is more preferable that all of $R^5$ and $R^6$ be methyl groups, because synthesis and handling are easy and excellent heat resistance can be easily obtained.

The content of the component (b) is preferably 0.1 to 5.0 parts by mass and more preferably 0.2 to 3.0 parts by mass, on the basis of 100 parts by mass of the component (a).

Component (c)

The catalyst used to form silicone rubber may be, for example, a hydrosilylation catalyst for promoting curing reactions. Known materials such as platinum compounds and rhodium compounds can be used as the hydrosilylation catalyst. The compounding amount of the catalyst can be set appropriately and is not particularly limited.

Component (d)

Examples of the thermally conductive filler include metals, metal compounds, and carbon fibers. A highly thermally conductive filler is further preferable, and specific examples thereof include the following materials.

Silicon metal (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor grown carbon fiber, PAN (polyacrylonitrile) carbon fiber, pitch-based carbon fiber.

These fillers can be used alone or in a mixed form of two or more types.

An average particle size of the filler is preferably from 1 to 50 μm from the viewpoint of handling and dispersibility, and more preferably from 3 to 30 μm. The average particle size mentioned here refers to a volume average particle size.

Further, as the shape of the filler, a spherical shape, a pulverized shape, a needle shape, a plate shape, and a whiskers shape are used. In particular, from the viewpoint of dispersibility, a filler having a spherical shape is preferable. Further, at least one type selected from the group consisting of a reinforcing filler, a heat-resistant filler, and a coloring filler may be added.

The content of the filler in the elastic layer is preferably 20% to 80% by volume and more preferably 30% to 60% by volume on the basis of the elastic layer, from the viewpoint of hardness and thermal conductivity of the elastic layer.

(7) Adhesive Layer

The fixing rotating member may include the adhesive layer 20*f* for bonding the surface layer 20*d* to be described later on the outer peripheral surface of the elastic layer 20*e*. The adhesive layer 20*f* is a layer for bonding the elastic layer 20*e* and the surface layer 20*d* together. The adhesive used for the adhesive layer 20*f* can be selected and used appropriately from known ones and is not particularly limited. However, from the viewpoint of ease of handling, it is preferable to use an addition curing silicone rubber containing a self-adhesive component.

The adhesive can contain, for example, a self-adhesive component, organopolysiloxane having a plurality of unsaturated aliphatic groups represented by vinyl groups in the molecular chain, hydrogenorganopolysiloxane, and a platinum compound as a crosslinking catalyst. The adhesive applied to the surface of the elastic layer 20*e* can be cured by an addition reaction to form the adhesive layer 20*f* for bonding the surface layer 20*d* to the elastic layer 20*e*.

The self-adhesive component may be, for example, the following components.

- Silane having at least one type, preferably two or more types, of functional groups selected from the group consisting of an alkenyl group such as a vinyl group, a (meth)acryloxy group, a hydrosilyl group (SiH group), an epoxy group, an alkoxysilyl group, a carbonyl group, and a phenyl group
- An organosilicon compound such as a cyclic or linear siloxane having from 2 silicon atoms to 30 silicon atoms, and preferably from 4 silicon atoms to 20 silicon atoms
- Non-silicon-based organic compounds (that is, not containing silicon atoms in the molecule), which may contain oxygen atoms in the molecule. However, from one to four, preferably from one to two aromatic rings such as from a monovalent to tetravalent, preferably from a divalent to tetravalent, are contained in one molecule. At least one, preferably two or more and four or less, functional groups (for example, alkenyl groups, (meth)acryloxy groups) that can contribute to a hydrosilylation addition reaction are contained in one molecule.

The above-mentioned self-adhesive component may be used alone or in combination of two or more types. In addition, filler components may be added to the adhesive within the scope of the disclosure from the viewpoint of adjusting viscosity and ensuring heat resistance. Examples of the filler component include the following.

Silica, Alumina, Iron Oxide, Cerium Oxide, Cerium Hydroxide, Carbon Black, and the Like The compounding amount of each component contained in the adhesive is not particularly limited, and may be set appropriately. Such addition curing silicone rubber adhesives are also commercially available and readily available. The thickness of the adhesive layer 20*f* is preferably 20 μm or less. By setting the thickness of the adhesive layer 20*f* to 20 μm or less, when the fixing belt according to this embodiment is used as a heating belt in a thermal fixing device, thermal resistance can be easily set to be small, and heat from the inner surface side can be efficiently transferred to a recording medium. The thickness of the adhesive layer 20*f* may be, for example, 1 μm to 20 μm and 2 μm to 10 μm.

(8) Surface Layer

The fixing rotating member may include the surface layer 20*d*. It is preferable that the surface layer 20*d* contain a fluorine resin in order to exhibit a function as a release layer for preventing the adhesion of toner to the outermost peripheral surface of the fixing rotating member. For the formation of the surface layer 20*d*, for example, a resin molded in a tube shape and exemplified below may be used, or the surface layer 20*d* may be formed by coating a resin dispersion.

Tetrafluoroethylene-Perfluoro (Alkylvinyl Ether) Copolymers (PFA), Polytetrafluoroethylene (PTFE), Tetrafluoroethylene-Hexafluoropropylene Copolymers (FEP), and the Like Among the resin materials exemplified above, PFA is particularly suitably used from the viewpoint of moldability and toner releaseability.

The thickness of the surface layer 20*d* is preferably from 10 μm to 50 μm. By setting the thickness of the surface layer 20*d* within this range, appropriate surface hardness of the fixing rotating member can be easily maintained.

EXAMPLE

In the following, Examples are explained. Note that the invention is not limited to the following Examples.

Example 1

The surface of a cylindrical stainless steel mold with an outer diameter of 30 mm was subjected to a mold release treatment and a commercially available polyimide precursor solution (U-Vanish S, manufactured by UBE Corporation) was applied by an immersion method to form a coating film. Next, this coating film was dried at 140° C. for 30 minutes to volatilize the solvent in the coating film, and then baked at 200° C. for 30 minutes and 400° C. for 30 minutes to imidize the coating film, forming a polyimide-coated resin based material with a film thickness of 40 μm and a length of 300 mm.

Next, a ring-shaped pattern with a width of 600 μm and intervals of 200 μm was formed on the resin based material using a dispenser device with an ink containing silver nanoparticles (DNS351S, manufactured by Daicel Corporation). Then, it was baked at 300° C. for 30 minutes to form the heat generating layer 20*b* with a film thickness of 2.5 μm and obtain a stacked body.

Next, a silicon dioxide layer was formed on the outer peripheral surface of the heat generating layer of the stacked body and on the outer peripheral surface of the resin base substrate in a region where the heat generating layer was not formed, by the following method.

A polysilazane solution (Durazane 2400-15, manufactured by Mark Co., Ltd.) was infiltrated into a urethane sponge, applied by tracing the surface of the stacked body, and then baked at 200° C. for one hour. The thickness of the resulting silicon dioxide layer was 0.85 μm.

Next, the entire surface of the silicon dioxide layer was ring-coated with a PAI solution (VYROMAX HR-16NN, manufactured by Toyobo Co., Ltd.). It was baked at 250° C. for 60 minutes to form the protective layer 20*c* having a thickness of 50 μm.

Next, a primer (trade name: DY39-051A/B, manufactured by Dow Toray Co., Ltd.) was applied substantially uniformly to the outer peripheral surface of the protective layer 20*c* so that a dry weight is 40 mg, the solvent was dried, and then a baking treatment was performed for 30 minutes in an electric furnace set at 160° C.

A silicone rubber composition layer having a thickness of 250 μm was formed on this primer by a ring coating method, and primary crosslinking was performed at 160° C. for 1 minute, and secondary crosslinking was performed at 200° C. for 30 minutes to form the elastic layer 20*e*.

The following silicone rubber composition was used.

As the organopolysiloxane having an alkenyl group of the component (a), vinylated polydimethylsiloxane having at least two vinyl groups in one molecule (trade name: DMS- V41, manufactured by Gelest Inc., a number average molecular weight of 68,000 (based on polystyrene), 0.04 mmol/g molar equivalent of a vinyl group) was prepared.

In addition, as the organopolysiloxane containing an Si—H group of the component (b), methylhydrogenpolysiloxane having at least two Si—H groups in one molecule (trade name: HMS-301, manufactured by Gelest Inc., a number average molecular weight 1,300 (based on polystyrene), 3.60 mmol/g molar equivalent of a Si—H group) was prepared. 0.5 parts by mass of the component (b) was added to 100 parts by mass of the component (a) and sufficiently mixed to obtain an addition curing silicone rubber stock solution.

Furthermore, a catalytic amount of an addition curing reaction catalyst (platinum catalyst: platinum carbonylcyclovinylmethylsiloxane complex) and an inhibitor were added as the component (c) and mixed sufficiently.

High-purity spherical alumina (trade name: Alnabeads CB-A10S; manufactured by Showa Titanium Co., Ltd.) was mixed as a heat-conductive filler of the component (d) with the addition curing silicone rubber stock solution at a volume ratio of 45% based on the elastic layer, and kneaded. An addition curing silicone rubber composition was then obtained with a JIS K 6253A durometer hardness of 10° after curing.

Next, an addition curing silicone rubber adhesive (trade name: SE1819CV A/B, manufactured by Dow Toray Co., Ltd.) for forming the adhesive layer **20*f* was substantially uniformly applied onto the obtained elastic layer 20*e* to a thickness of approximately 20 μm. A fluororesin tube (trade name: NSE, manufactured by Gunze Limited) with an inner diameter of 29 mm and a thickness of 30 μm for forming the surface layer 20*d*** was stacked while expanding its diameter.

Thereafter, by uniformly pressing the belt surface from above the fluororesin tube, an excess adhesive was pressed out from between the elastic layer **20*e* and the fluororesin tube so that the thickness of the adhesive layer 20*f* became thin to approximately 5 μm. Next, the adhesive was cured by performing heating at 200° C. for 30 minutes, the fluororesin tube was fixed onto the adhesive layer 20*f*** and removed from the stainless steel mold. Finally, both ends thereof were cut to a length of 240 mm to obtain a fixing rotating member. The number average crystal grain size of silver in the heat generating layer in the resulting fixing rotating member was 160 nm, and the porosity was 29%. In addition, silicon dioxide was filled in the entire hole that is provided on the outer peripheral surface side of the heat generating layer and has an opening at the surface thereof facing the resin layer.

Example 2

A fixing rotating member was obtained in the same manner as in Example 1, except that the method for forming the silicon dioxide layer was changed to a method in which a polysilazane solution (Silica Shield SSL-SD500, manufactured by Exousia Inc.) was infiltrated into a urethane sponge and applied by tracing the surface of the stacked body, and then baking performed at 250° C. for one hour was repeated three times. The thickness of the resulting silicon dioxide layer was 0.90 μm.

The number average crystal grain size of silver in the heat generating layer in the resulting fixing rotating member was 180 nm, and the porosity was 30%. In addition, silicon dioxide was filled in the entire hole that is provided on the outer peripheral surface side of the heat generating layer and has an opening at the surface thereof facing the resin layer.

Example 3

A fixing rotating member was prepared in the same manner as in Example 1 except that coating and baking were repeated twice in the method of forming the silicon dioxide layer. The thickness of the resulting silicon dioxide layer was 1.5 μm. The number average crystal grain size of silver in the heat generating layer was 190 nm, and the porosity was 29%. In addition, silicon dioxide was filled in the entire hole that is provided on the outer peripheral surface side of the heat generating layer and has an opening at the surface thereof facing the resin layer.

Example 4

A fixing rotating member was prepared in the same manner as in Example 1 except that the heat generating layer was baked at a temperature of 150° C. for 30 minutes. The thickness of the resulting silicon dioxide layer was 0.85 μm. The number average crystal grain size of silver in the heat generating layer was 135 nm, and the porosity was 10%. In addition, silicon dioxide was filled in the entire hole that is provided on the outer peripheral surface side of the heat generating layer and has an opening at the surface thereof facing the resin layer.

Example 5

A fixing rotating member was prepared in the same manner as in Example 1 except that a coating condition was changed so that the film thickness of the heat generating layer was 5.5 μm. The thickness of the resulting silicon dioxide layer was 0.80 μm. The number average crystal grain size of silver in the heat generating layer was 200 nm, and the porosity was 39%. In addition, silicon dioxide was filled in the entire hole that is provided on the outer peripheral surface side of the heat generating layer and has an opening at the surface thereof facing the resin layer.

Example 6

A fixing rotating member was prepared in the same manner as in Example 2 except that a heat generating layer was formed and then a silicon dioxide layer was formed by spray coating. The thickness of the resulting silicon dioxide layer was 0.80 μm. The number average crystal grain size of silver in the heat generating layer was 200 nm, and the porosity was 41%. In addition, silicon dioxide was filled in a part of a hole that is provided on the outer peripheral surface side of the heat generating layer and has an opening at the surface thereof facing the resin layer.

Comparative Example 1

A fixing rotating member was prepared in the same manner as in Example 1 except that a silicon dioxide layer was not formed after a heat generating layer was formed. The number average crystal grain size of silver in the heat generating layer was 180 nm, and the porosity was 39%.

Comparative Example 2

A fixing rotating member was manufactured in the same manner as in Example 1 except that the heat generating layer 20*b* was formed by a silver plating method. The formation of the heat generating layer 20*b* by the silver plating method was performed by the following method.

A cylindrical polyimide film was prepared, and a ring-shaped masking material was disposed on the surface thereof. Subsequently, a silver potassium cyanide bath was used as a silver plating bath to perform a plating treatment. pH of the plating bath was 8 to 9, and the temperature of the plating bath was maintained at 50° C. to 70° C. After removal from the plating bath, the masking material was removed through a cleaning step to obtain a base layer on which a heat generating layer having a thickness of 2.5 μm was formed.

Evaluation: Resistance Fluctuation Rate

High Temperature Test

The fixing rotating member prepared in each of the examples and comparative examples was cut into half, one half was used for initial resistance evaluation, and the other half was used for evaluation after heating (high temperature test). The high temperature test was performed by storing the fixing rotating member under atmospheric pressure at 240° C. for 200 hours. This storage temperature was set from an overheating temperature assumed in the paper non-passing portion under a special use environment (in the case of continuous printing of small-size paper) when the fixing rotating member was actually incorporated into a fixing unit and used.

Resistance Value Measurement Method

A resistance fluctuation rate was evaluated using contact resistance measurement. When measuring resistance, the resin layer portion was peeled off using a cutter, and measurement was performed by a four-terminal resistance measurement method. The resistance measurement will be described in detail below.

Resistance measurements were performed using a resistance meter 3541 manufactured by HIOKI E.E. Corporation, and two FPC-GS-500 probes manufactured by Form Factor, Inc. The mode was set to a low power mode, and a resistance value was measured by pressing the probes against the heat generating layer so that a distance between the respective sense probes was 20 mm. The measured value was converted into a volume resistivity using the width and film thickness of the heat generating layer.

Similar measurements were performed before and after heating, and a fluctuation in volume resistivity value from an initial value was evaluated with the value before heating as the initial value. The results are shown in Table 1.

Evaluation: Compressive Elastic Modulus

The compressive elastic modulus of the heat generating layer was measured by the following method.

First, the surface layer and the elastic layer were peeled off from the fixing rotating member, and the resin base material, the heat generating layer, and the stacked body of the resin layer were removed. Next, a polyimide film remover (e-Solve 21KZE-100, manufactured by KANEKO CHEMICAL) was applied to the surface of the resin base material and heated at 40° C. for 10 minutes.

Thereafter, the resin base material was cooled to room temperature, cleaned with pure water, dried, and then removed, and the heat generating layer on the surface opposite to the surface facing the silicon dioxide layer was exposed. For the surface of the exposed heat generating layer, a compressive elastic modulus was measured using a Berkovich indenter by using a micro-indentation hardness tester (trade name: Nano Indenter G200, manufactured by Agilent Technologies).

A measurement region was pushed into a depth of 1 μm in a thickness direction from the surface of the heat generating layer on a side opposite to the surface facing the silicon dioxide layer, an average value of a compressive elastic modulus at each depth position measured in a region of 10% to 20% of the depth, that is, in a region from 0.1 μm to 0.2 μm from the surface was calculated, and an average elastic modulus in this region was calculated. The results are shown in Table 1.

Evaluation: Actual Durability Test

For the fixing rotating members in Examples 1 to 6 and Comparative Examples 1 and 2, a paper feed durability test was performed under the following conditions.

Each of the fixing rotating members was incorporated into a fixing device, the fixing device was mounted on a laser printer, and a paper feed durability test was performed in an environment with a temperature of 15° C. and a humidity of 10%, in which 500,000 sheets were printed using B5-sized recording materials without printing any images. After every 10,000 sheets, an A4-sized recording material was printed to confirm whether deformation occurred at paper edges and confirm a fixing property at the edges. As the laser printer, an apparatus was used which was modified so that a pressure roller and a fixing rotating member could be rotated at a higher speed (linear velocity of 400 mm/s) than usual based on Satera LBP961Ci (trade name) manufactured by Canon Marketing Japan Inc.

As the recording material for paper feeding, NPI high quality paper (B5 size, thickness of 120 μm, manufactured by Nippon Paper Industries Co., Ltd.) was used. Printing was performed using an A4-size NPI high quality thick paper (A4 size, thickness of 148 μm, manufactured by Canon Marketing Japan Inc.) as a recording material for printing to confirm whether an image had a defect. The results are shown in Table 1.

The results of the actual durability test were ranked according to the following criteria.

Rank A: No image defects occurred even after 500,000 sheets were fed.

Rank B: Slight image defects occurred after 500,000 sheets were fed.

Rank C: Slight image defects occurred before 500,000 sheets were fed.

Rank D: Image defects occurred after less than 200,000 sheets were fed.

TABLE 1

| | Heat generating layer | | | | | | $SiO_2$ layer | |
|---|---|---|---|---|---|---|---|---|
| | Resin base material Type | Metal species | Thickness µm | Average crystal grain size nm | Porosity % | Compressive elastic modulus Gpa | Material | Installation method |
| Example 1 | PI | Ag | 2.5 | 160 | 29 | 11 | Durazane | Coating |
| Example 2 | PI | Ag | 2.5 | 180 | 30 | 10 | Silica Shield | Coating |
| Example 3 | PI | Ag | 2.5 | 190 | 29 | 11 | Durazane | Coating |
| Example 4 | PI | Ag | 2.5 | 135 | 10 | 40 | Durazane | Coating |
| Example 5 | PI | Ag | 5.5 | 200 | 39 | 10 | Durazane | Coating |
| Example 6 | PI | Ag | 2.5 | 200 | 41 | 11 | Silica Shield | Spraying |
| Comparative Example 1 | PI | Ag | 2.5 | 180 | 39 | 11 | — | — |
| Comparative Example 2 | PI | Ag plating | 2.5 | — | 0 | 97 | — | — |

| | $SiO_2$ layer Thickness µm | Filling of open hole | Resin layer Type | Heating evaluation Resistance fluctuation rate % | Image rank | Image after durability of 500,000 sheets |
|---|---|---|---|---|---|---|
| Example 1 | 0.85 | Filled | PAI | 3.5 | A | No image defect |
| Example 2 | 0.90 | Filled | PAI | 3 | A | No image defect |
| Example 3 | 1.50 | Filled | PAI | 6.5 | B | Slight fixing defect at portion corresponding to B5 paper non-passing portion |
| Example 4 | 0.85 | Filled | PAI | 3.2 | B | Slight image streak at edge of B5-size paper |
| Example 5 | 0.80 | Filled | PAI | 3.5 | B | Image streak at edge of B5-size paper and slight fixing defect on entire surface |
| Example 6 | 0.80 | Partially filled | PAI | 12 | C | Slight fixing defect at edge when 200,000 sheets were fed |
| Comparative Example 1 | — | — | PAI | 20 | D | Fixing defect at edge when 150,000 sheets were fed |
| Comparative Example 2 | — | — | PAI | 1 | D | Image streak due to deformation at edge when 80,000 sheets were fed |

In Table 1, "Ag" indicates silver, "PAI" indicates polyamide-imide, and "PI" indicates polyimide.

In Example 3, the thickness of the silicon dioxide layer was made thicker than in Example 1. As a result, a slight fixing defect was observed in a portion corresponding to a paper non-passing portion of B5-size paper after 500,000 sheets were fed. This is considered that the thickness of the silicon dioxide layer was large, slight cracks occurred during repeated bending durability, and an oxygen-inhibiting function was reduced, resulting in an increased resistance value in a high-temperature environment at the paper non-passing portion. In Example 4, the fixing rotating member having a lower porosity of the heat generating layer than in Example 1 was obtained. As a result, slight streaked image defects occurred during A4-size printing. It is considered that this is because slight deformation occurred at a position corresponding to the paper edge of the B5 paper. In Example 5, slight image defects occurred at edges during printing on the A4-size paper. Although a fluctuation rate of a resistance value was 3.5% in heating evaluation in a stationary state, it is considered that the heat generating layer had a large thickness of 5.5 µm, and thus a slight crack occurred on the surface of the heat generating layer due to bending stress during paper feed durability, resulting in an increase in resistance value.

In Comparative Example 1, each evaluation was performed without installing a silicon dioxide layer. For this reason, an increase in resistance at a high temperature was confirmed with prior heating evaluation. Even during paper feed durability in an actual machine, an image defect occurred at an edge when A4-size paper was fed after B5-size 150,000 sheets were fed. It is considered that an increase in resistance occurred at a portion corresponding to a paper non-passing portion of the B5-size paper. In Example 6, the silicon dioxide layer was placed by spray coating. Due to the spray coating, a portion of the open hole was filled with silicon dioxide, but the silicon dioxide layer could not be formed completely up to the inside of the open hole, a resistance fluctuation rate at a high temperature was slightly high at 12%, and even during paper feed durability, a slight image defect occurred at a position corresponding to a paper non-passing portion of B5-size paper at a point in time when 200,000 sheets were fed.

In Comparative Example 2, the heat generating layer was formed by silver plating. For this reason, no pores are present in the heat generating layer. At a point in time when 80,000 sheets were fed, deformation occurred at a position corresponding to the paper edge of the B5-size paper, and an image defect occurred in the A4 paper. It is considered that a damper effect by the pores was not exhibited.

As described above, according to at least one aspect of the present disclosure, a fixing rotating member having excellent durability even in a printing environment in which a high temperature state continues for a long time is provided.

In addition, according to at least one aspect of the present disclosure, a fixing device including the fixing rotating member is provided.

In addition, according to at least one aspect of the present disclosure, an electrophotographic image forming apparatus including the fixing device is provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-070421, filed Apr. 24, 2024, which is hereby incorporated by reference herein in its entirety.

What is claimed is:

1. A fixing rotating member, comprising:

a resin base material;

a heat generating layer extending on an outer peripheral surface of the resin base material;

a silicon dioxide layer on an outer peripheral surface of the heat generating layer and on the outer peripheral surface of the resin base material in a region where the heat generating layer is not provided; and a resin layer on an outer peripheral surface of the silicon dioxide layer, wherein the heat generating layer comprises silver, the heat generating layer has a hole having an opening at a surface thereof facing the resin layer, the hole being at least partially filled with silicon dioxide, and the heat generating layer has pores.

2. The fixing rotating member according to claim 1, wherein the silver is a silver crystal, and the silver crystal has a number average crystal grain size of 500 nm or less.

3. The fixing rotating member according to claim 1, wherein a proportion of the pores in a cross-section of the heat generating layer, which is measured by observing a cross-section obtained by cutting the heat generating layer sampled from the fixing rotating member in a thickness direction, is 15 to 50 area %.

4. The fixing rotating member according to claim 1, wherein a thickness of the heat generating layer is 5.0 μm or less.

5. The fixing rotating member according to claim 1, wherein a thickness of the silicon dioxide layer is 1.00 μm or less.

6. The fixing rotating member according to claim 1, wherein a compressive elastic modulus in a region of 10 to 20% in a thickness direction of the heat generating layer, which is measured by bringing an indenter into contact with a surface of the heat generating layer on a side opposite to a surface facing the silicon dioxide layer, is 8 to 30 GPa.

7. The fixing rotating member according to claim 1, wherein the heat generating layer has a plurality of segments arranged in a rotation axis direction of the fixing rotating member and electrically separated from each other, and each of the plurality of segments is electrically continuous over an entire region of the fixing rotating member in a circumferential direction.

8. A fixing device comprising:

a fixing rotating member; and an induction heating device that causes the fixing rotating member to generate heat by induction heating, wherein the fixing rotating member comprising:

a resin base material;

a heat generating layer extending on an outer peripheral surface of the resin base material;

a silicon dioxide layer on an outer peripheral surface of the heat generating layer and on the outer peripheral surface of the resin base material in a region where the heat generating layer is not provided; and a resin layer on an outer peripheral surface of the silicon dioxide layer, wherein the heat generating layer comprises silver, the heat generating layer has a hole having an opening at a surface thereof facing the resin layer, the hole being at least partially filled with silicon dioxide, and the heat generating layer has pores.

9. An electrophotographic image forming apparatus comprising:

an image carrier that carries a toner image;

a transfer device that transfers the toner image to a recording material; and a fixing device that fixes the transferred toner image on the recording material, wherein the fixing device comprising:

a fixing rotating member; and an induction heating device that causes the fixing rotating member to generate heat by induction heating, wherein the fixing rotating member comprising:

a resin base material;

a heat generating layer extending on an outer peripheral surface of the resin base material;

a silicon dioxide layer on an outer peripheral surface of the heat generating layer and on the outer peripheral surface of the resin base material in a region where the heat generating layer is not provided; and a resin layer on an outer peripheral surface of the silicon dioxide layer, wherein the heat generating layer comprises silver, the heat generating layer has a hole having an opening at a surface thereof facing the resin layer, the hole being at least partially filled with silicon dioxide, and the heat generating layer has pores.

* * * * *